United States Patent
Van Gorkom et al.

(10) Patent No.: US 7,667,785 B2
(45) Date of Patent: Feb. 23, 2010

(54) OPTICAL SEPARATING FILTER

(75) Inventors: Ramon Pascal Van Gorkom, Eindhoven (NL); Peter Alexander Duine, Eindhoven (NL); Siebe Tjerk De Zwart, Eindhoven (NL); Anthonie Hendrik Bergman, Eindhoven (NL); Michel Cornelis Josephus Marie Vissenberg, Eindhoven (NL); Marinus Josephus Jakobus Dona, Veldhoven (NL); Cornelius Antonius Van Den Heuvel, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 597 days.

(21) Appl. No.: 11/570,445

(22) PCT Filed: Jun. 10, 2005

(86) PCT No.: PCT/IB2005/051916

§ 371 (c)(1),
(2), (4) Date: Dec. 12, 2006

(87) PCT Pub. No.: WO2005/124404

PCT Pub. Date: Dec. 29, 2005

(65) Prior Publication Data

US 2008/0231960 A1 Sep. 25, 2008

(30) Foreign Application Priority Data

Jun. 17, 2004 (EP) ................................. 04102766

(51) Int. Cl.
*G02F 1/1335* (2006.01)

(52) U.S. Cl. ............................... 349/57; 349/62; 349/95
(58) Field of Classification Search .................. 349/57, 349/62, 95
See application file for complete search history.

(56) References Cited

U.S. PATENT DOCUMENTS

| 5,757,547 | A | 5/1998 | Rodman et al. |
| 6,147,725 | A | 11/2000 | Yuuki et al. |
| 2002/0105710 | A1 | 8/2002 | Lee et al. |
| 2002/0180909 | A1 | 12/2002 | Lubart et al. |
| 2003/0147027 | A1 | 8/2003 | Wachi |
| 2008/0192178 | A1* | 8/2008 | Ben-David et al. ............ 349/68 |

OTHER PUBLICATIONS

Ko et al; "High-Efficiency Micro-Optical Filter for Liquid-Crystal Projection System Applications"; Applied Optics, vol. 39, No. 7, Mar. 1, 2000.

* cited by examiner

*Primary Examiner*—David Nelms
*Assistant Examiner*—David Y Chung

(57) ABSTRACT

An optical separating filter separates impinging light into a first and a second part having different properties. The separating filter comprises reflective filters (FR) arranged in funnel shaped structures (F1). Each one of the structures (F1) have an inlet area (IA1) to receive the impinging light (IL) and an outlet area (OA1) smaller than the inlet area. (IA1) to converge reflected impinging light (RL) towards the outlet area (OA1). The structures (F1) comprise a first group of funnel shaped structures (F1) constructed to reflect light which has a first property (C1) towards their respective first outlet areas (OA1) and for transmitting light which has a second property (C2) towards respective second outlet areas (OA2).

31 Claims, 8 Drawing Sheets

OPTICAL SEPARATING FILTER

Figure 1:
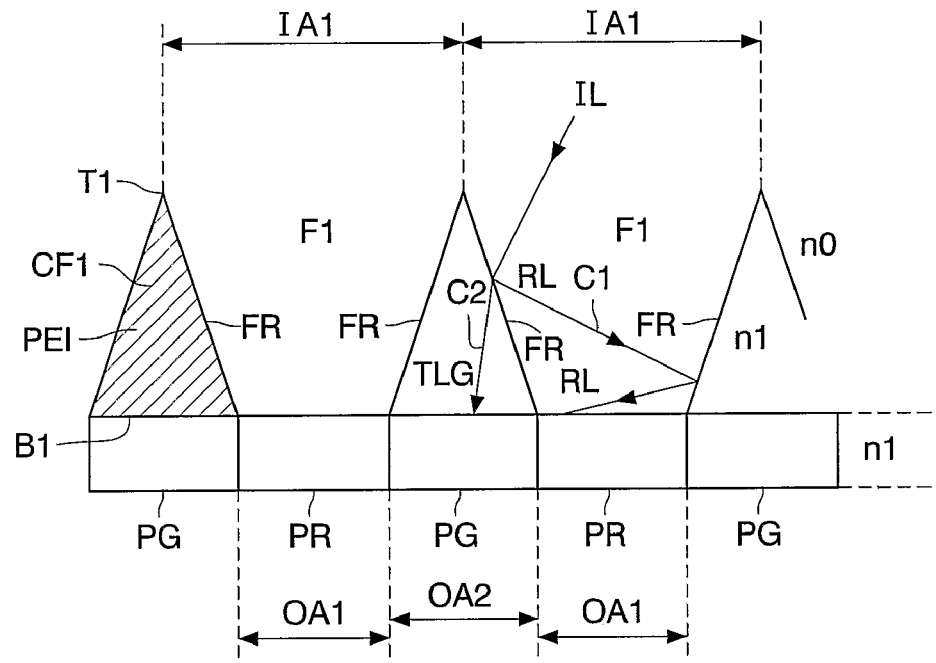

The invention relates to an optical separating filter, a display panel comprising such an optical separating filter, a display apparatus comprising such a display panel, and a solar panel comprising such an optical separating filter.

The publication "High-efficiency micro-optical color filter for liquid-crystal projection system applications" by Fu-Jen Ko and Han-Ping David Shieh, published in APPLIED OPTICS, Vol. 39, No. 7, on 1 Mar. 2000, discloses color filters for a liquid crystal (LC) projection system. The color filters are composed of a micro-prism array, optical interference color filters, and a micro-lens array light compressor to increase the optical throughput of LC-projection systems. The device utilizes the energy of the whole spectrum by distributing the energy of the spectrum to the respective color pixel areas. The micro-prism array color filters are composed of 45°-90°-45° prism arrays. Each prism constitutes a sub-pixel and has a hypotenuse plane coated with a respective one of dichroic filters to separate the three primary colors. The hypotenuse planes are arranged at 45° angles, the dichroic filters reflect impinging light which has an angle of 45° with the hypotenuse planes to an adjacent hypotenuse plane with a different dichroic filter. This latter hypotenuse plane reflects the light towards the pixels. The light which is transmitted through the first mentioned dichroic filter will reach another one of the pixels.

This structure uses total internal reflection, but this total internal reflection is not obtained for all angles of the impinging light. Hence not all light directed from every angle will be correctly sent to the output areas. If a diffuse scattering display is used (as for example e-ink) this will further reduce the effectiveness of the structure as the returning light is not collimated anymore.

It is an object of the invention to increase the amount of the impinging light that reaches the appropriate pixels, i.e. to increase the acceptance angle of the structure.

A first aspect of the invention provides an optical separating filter as claimed in claim 1. A second aspect of the invention provides a display panel as claimed in claim 27. A third aspect of the invention provides a display apparatus as claimed in claim 30. A fourth aspect of the invention provides a solar panel as claimed in claim 31. Advantageous embodiments are defined in the dependent claims.

The optical separating filter in accordance to the first aspect of the invention separates and collimates impinging light into a first and a second part having different properties. The different properties may be different colors (thus, different parts of the spectrum) or different polarization states. The separating filter comprises reflective filters which are arranged in funnel shaped structures. Each one of these structures has an inlet area to receive the impinging light and an outlet area which is smaller than the inlet area. The walls of the structures reflect part of the impinging light and transmit another part of the impinging light. The reflected light has the first property; the transmitted light has the second property. The walls have a decreasing distance with respect to each other towards the outlet area to converge reflected impinging light towards the outlet area. Thus, the walls of the funnel shaped structures are converging towards each other from the inlet area to outlet area and consequently do not extend in parallel as disclosed in the prior art publication referred to earlier. The structures comprise a first group of funnel shaped structures constructed to reflect light which has the first property towards their respective first outlet areas and to transmit light which has the second property towards respective second outlet areas. Thus, the light which impinges on the reflective filters of the funnel shaped structures is partly reflected and partly transmitted. The reflected light has other properties than the transmitted light.

The concentrating effect of the funnel shaped structures and thus the geometrical shape of the reflective filters has the advantage over the earlier mentioned publication that a larger part of the light will reach the pixels and thus the brightness reached with the funnel construction is higher than the brightness reached with the prior art structure. Further, the amount of light rays not reaching the outlet areas is lower, and the brightness is less dependent on the viewing angle due to the more symmetrical construction.

The funnel shaped structures may be hollow funnels, but may also be filled with a light transmissive material. The funnels need not be symmetrical funnels; the steepness of the walls may vary, even of a single funnel. The steepness of the walls of different funnels may be different. The walls need not be plane, also concave or convex walls can be used. If the optical separating filter is combined with a display, each outlet area cooperates with one (or more) of the (sub-) pixels of the display and the optical separating filter separates different parts of the spectrum. Then, the first property is a first color and the second property is a second color different than the first color. The optical filters may also separate different polarizing states. The outlet areas may also cooperate with other elements than pixels, such as, for example, solar cells. These solar cells may operate more efficient because they can be optimized for a particular color light. Usually, the first and the second outlet areas are positioned in a same plane, and do not overlap each other. There may be free space in-between adjacent outlet areas where no light or light which did not transmit through funnel walls leaves the optical filter.

In an embodiment as claimed in claim 2, the first group is arranged to form a plurality of first optical filters which cover the second outlet areas. This has the advantage that the same reflective filters can be used to both reflectively concentrate the light with the first property towards the first outlet areas and to transmit the light with the second property towards the second outlet areas. Thus, an economical solution is provided.

In an embodiment as claimed in claim 3, the structures comprise a first group of funnel shaped structures constructed to reflect light which has the first property towards their respective first outlet areas and to transmit light which has the second property towards respective second outlet areas of a second group of funnel shaped structures. The second group of funnel shaped structures is constructed to reflect light which has the second property towards their respective second outlet areas and to transmit light which has the first property to the respective first outlet areas. This embodiment has an improved color separation because both the light directed towards the first outlet areas and towards the second outlet areas are filtered by the second and the first group of funnel shaped structures, respectively.

In an embodiment as claimed in claim 4, the first group of funnel shaped structures is arranged to form a plurality of first optical filters covering the second outlet areas. The second group of funnel shaped structures is arranged to form a plurality of second optical filters covering the first outlet areas. In this manner, the walls of the funnel of outlet areas which are positioned adjacent a particular outlet area cover this particular outlet area and thus form a transmissive filter towards this particular outlet area. Also this embodiment has an improved color separation because both the light directed towards the first outlet areas and towards the second outlet areas are filtered by the second and the first group of funnel shaped structures, respectively. Further, this embodiment is economical because the reflective filters which concentrate the light towards particular outlet areas (and which also transmit light having another property) also form transmissive filters for other outlet areas.

Usually, the volume between the walls of the funnel shaped structures and the associated outlet area are filled with the same material. However, in principle, the walls may have a limited thickness. The optical filters may cover the associated outlet area exactly or substantially completely, or may be larger than the outlet area.

In an embodiment as claimed in claim 5, the first optical filters which cover the second outlet areas comprises structures with a polygonal shaped base plane, further also referred to as the base. In the direction towards the impinging light, the cross section parallel to the base gradually narrows in one or two dimensions.

In an embodiment as claimed in claim 6, the first optical filters which cover the second outlet areas comprise pyramidal shaped elements. The base of each one of the pyramidal shaped elements is directed towards its associated one of the second outlet areas. Thus, the tops of the pyramidal shaped elements are directed towards the impinging light. With pyramidal shaped is meant that a shape which resembles a pyramid in that it has a base which covers an area substantially larger than an area of the top. Although preferred, it is not required that the top is pointed, it may be flat. Further, the base may have another shape than a triangle. The walls of the pyramid may be flat, concave or convex. However, convex walls will deteriorate the converging effect.

In an embodiment as claimed in claim 7, the first optical filters comprise pyramidal shaped elements with bases directed towards the second outlet areas and all having a first height. The second optical filters comprise pyramidal shaped elements with bases directed towards the first outlet areas and all having a second height being different than the first height. The difference in height of the different pyramids causes the side walls of the pyramids to have different angles. These different angles cause different layer thicknesses when the color filter is evaporated onto the pyramidal shaped elements. Consequently, the optical filter characteristics of the pyramids with different heights will be different, especially if the color filter is an interference stack.

In an embodiment as claimed in claim 8, the bases of the different pyramidal shaped elements have different dimensions to obtain the different angles of the side walls. The height of the pyramidal elements may now be the same. Again, the different angles cause a different layer thickness of the color filter is evaporated onto the pyramidal shaped elements.

In an embodiment as claimed in claim 9, the first group of funnel shaped structures and the second group of funnel shaped structures comprise a first stack of layers and a second stack of layers, respectively, arranged on side walls of the first and the second funnel shaped structures, respectively. The successive layers of both the first and the second stack have different refractive indexes. The stacks of layers may be provided on the funnel shaped structures by evaporation with or without a mask. If masks are used, different stacks may be constructed on different funnel shaped structures to obtain the different optical filters. Without the use of masks, the same layers will be evaporated in the same order on the different funnel shaped structures. Different filters are now possible by creating different layers thicknesses on the different funnel shaped structures by giving side walls of the funnel shaped structures different angles with respect to the flux of material being evaporated.

In an optical separating filter as claimed in claim 10, the first and second optical filters are obtained by arranging a stack of layers on the side walls of the pyramidal shaped elements. The stack of layers comprises at least two layers with different refractive index. Preferably, the stack is an interference stack which comprises groups of consecutive layers. The consecutive layers have a different refractive index.

Preferable, in each of the groups the different consecutive layers are arranged in the same order. The thickness of corresponding layers and thus the thickness of the resulting stacks are different for the side walls of the first and the second pyramidal shaped elements to obtain optical filters which have a peak reflectivity at different wavelengths of the light.

Preferably, each one of the layers of the stacks on the first and the second pyramidal shaped elements are applied in one and the same process step on all pyramidal shaped elements, preferably by evaporating. The different thickness of the corresponding layers of the stacks, and thus in the end of the stacks, is selected by suitably adapting the angles of the pyramidal shaped elements. The layer thickness decreases with an increasing angle between on the one hand the side walls of the pyramidal shaped elements and on the other hand the base plane of the pyramidal shaped elements. Preferably, all pyramidal shaped elements have parallel arranged base planes, and the layers are evaporates with a flux substantially perpendicular to the base planes. Usually, the base planes of all the pyramidal shaped element lie in a same plane.

Preferably, a stack comprises multiple groups of two layers. Each group of two layers has the same type of layers in the same order. The refractive index of the two layers in the same group is different. The thickness of corresponding layers in the groups may be different, but the thickness of at least some of the different groups should be substantially identical. The first order peak of the reflectivity of such a stack of groups of layers occurs for light of which half a wavelength is equal to the optical thickness of the groups of layers. The optical thickness is the physical thickness of the layer multiplied by the refractive index. The second order peak of the reflectivity of the stack occurs for light of which one wavelength is equal to the thickness of the groups of layers thus for light with a shorter wavelength. Even higher order peaks of reflectivity occur at even shorter wavelengths.

In an embodiment as claimed in claim 11, the angle of the side walls of the first pyramidal shaped elements and the angle of the side walls of the second pyramidal shaped elements are selected to obtain a thickness of the stack of layers on the first pyramidal shaped elements different than a thickness of the stack of layers on the second pyramidal shaped elements. The different thickness of the stacks is selected to obtain a first optical filter on the first pyramidal shaped elements with a first order reflection peak at a wavelength different than a first order reflection peak of a second optical filter on the second pyramidal shaped elements.

It is of course possible to create three different optical filters on pyramidal shaped elements which have side walls with three different angles. The different angles may be obtained by giving the different pyramidal shaped elements three different heights.

In an embodiment as claimed in claim 12, the angle of the side walls of the first pyramidal shaped elements is smaller than the angle of the side walls of the second pyramidal shaped elements. The different thickness of the stacks is selected to obtain a first order reflection peak of the first optical filter which occurs at a longer wavelength than a first order reflection peak of the second optical filter. For example, the angles are selected to obtain the first order reflection peak of the first optical filter for red light and the first order reflection peak of the second optical filter for blue light.

In an embodiment as claimed in claim 13, the angle of the side walls of the first pyramidal shaped elements is smaller than the angle of the side walls of the second pyramidal shaped elements. The different thickness of the stacks is selected to obtain a second order reflection peak of the first optical filter which occurs at a shorter wavelength than a first order reflection peak of the second optical filter. For example, the angles are selected to obtain the second order reflection peak of the first optical filter for blue light and the first order reflection peak of the second optical filter for red light.

In an embodiment as claimed in claim 14, the stack is selected to obtain a first order reflection peak of the first optical filter which lies outside the visible range of light. For example, if the second order reflection peak of the first optical filter occurs for blue light, the first order reflection peak of the first optical filter may occur in the infrared red range.

In an embodiment as claimed in claim 15, the shape of the bases of the pyramidal shaped elements is triangular, quadrangular, rectangular, square, or hexagonal. These shapes have the advantage that neighboring outlet areas can be directly connected to each other. Other shapes, for example, pentagonal pyramids are possible, but then some free area will occur between at least some adjacent outlet areas and the efficiency may decrease. Alternatively we can also use a combination of e.g. pentagonal and quadrilateral shaped bases, the so-called Penrose tiling.

In an embodiment as claimed in claim 16, a particular one of the first outlet areas is surrounded by second outlet areas to obtain a pattern of alternating first outlet areas and second outlet areas. Such a construction has the advantage that the funnel shaped structure which reflects light towards the particular one of the first outlet areas and which is constructed to transmit the light towards the second outlet areas can transmit the transmitted light in all directions towards second outlet areas, and all the light will reach an outlet area.

In an embodiment as claimed in claim 17, the optical separating filter further comprises third outlet areas. The first group of funnel shaped structures is positioned to reflect light having the first property towards associated first and associated third outlet areas. The first group of funnel shaped structures transmits light having the second property. The first property is a first color and the second property is a second color different than the first color. First color filters are arranged to filter light directed towards the third outlet areas, and second color filters are arranged to filter light directed towards the first outlet areas. The colors of light impinging on the first, second and third outlet areas are different. This construction of the optical separating filter is able to separate the impinging light into three different colors. Usually, the three different colors are primary colors which are directed to associated pixels of a display. The efficiency of such a separating filter with funnels and color filters is higher than the usual construction wherein each pixel has its own absorbing color filter. Each absorbing filter has to absorb all the light not contributing to the primary color. In the construction in accordance with the invention, because the light is first separated in two light streams of different colors and than filtered, part of the light is directed to another pixel before it has to be filtered and thus the amount of light absorbed by the color filters is less.

It has to be noted that with light having a first color is meant that this light only covers a first part of the spectrum. This first part may in fact cover several colors. In the same manner, the light having a second color covers a second part of the spectrum which is different than the first part. The second part may partly overlap the first part but must not coincide. For example, the light having the first color may cover the blue part of the visible spectrum, while the second color may cover the rest of the visible spectrum. Consequently, the light directed to the first and third outlet areas is bluish, and the light directed towards the second outlet areas is yellowish (or orange).

In an embodiment as claimed in claim 18, third color filters filter light directed towards the second outlet areas to further improve the color separation. These third color filters are in fact similar to the usual absorbing filters. Because the light has been pre-filtered by the reflective filters, less light will be absorbed, and thus the efficiency will be higher.

In an embodiment as claimed in claim 19, the first optical filters comprise pyramidal shaped elements associated with corresponding ones of the first and the third outlet areas, bases of these pyramidal shaped elements are directed towards the first and the third outlet areas, respectively. Thus the same pyramidal shaped structures are used to be positioned towards the first and the third outlet areas.

In an embodiment as claimed in claim 20, at least one of the funnel shaped structures of the first group of funnel shaped structures comprises a first section which reflects light having the first property and which transmits light having the second property, and a second section which is reflective for light having both the first and second property. In this manner, a non-symmetrical funnel shaped structure is obtained which may be advantageously used if not all outlet areas are covered with a reflective filter which is also providing the converging funnel. The impinging light may reach such outlet areas directly or via an absorbing color filter.

In an embodiment as claimed in claim 21, the second section which is reflective for light having both the first and second property is arranged substantially perpendicular to a plane wherein the first and second outlets are arranged. Now the outlet area not covered with a reflective filter which is also providing the converging funnel is present between the substantially perpendicular second sections and thus is optimally positioned to receive the impinging light directly or via an absorbing filter.

In an embodiment as claimed in claim 22, the optical separating filter comprises third outlet areas arranged in-between at least two substantially vertically arranged second sections being reflective for light having both the first and second property, wherein the first property is a first color and the second property is a second color being different than the first color. A first absorbing color filter filters light directed towards the third outlet areas. The colors of light impinging on the first, second and third outlet areas are different.

In an embodiment as claimed in claim 23, the first group of funnel shaped structures and the second group of funnel shaped structures are arranged in a first plane parallel to an output plane wherein the outlet areas are arranged. This first and second group of funnel shaped elements separates the impinging light into light which has a first property and light which has a second property. The display further comprises a third group of funnel shaped structures and a fourth group of funnel shaped structures which are arranged in a second plane parallel with the output plane and in-between the first plane and the output plane. These third and fourth groups of funnel shaped elements are arranged to split at least the light having the first property in light having a third and a fourth property, such that the impinging light is separated in light having at least three different properties.

In an embodiment as claimed in claim 24, a preferred construction of a two plane stack of pyramidal shaped structures able to separate the impinging light into three different colors with a high efficiency is defined. This embodiment is elucidated in detail with respect to FIG. 7.

In an embodiment as claimed in claim 27, the display panel comprises the optical separating filter. The first outlet areas are associated with respective first pixel elements of the display, and the second outlet areas are associated with respective second pixel elements of the display. Thus, the impinging light is separated into two different colors which are directed to different pixel elements. The amount of light which is reflected depends on the state of the pixel elements. It is thus possible to create a color display with a very high brightness because almost all the light impinging can be reflected if the pixel elements are in their reflective state. The display panel may be a matrix display able to display images, text, video or other information. The pixel elements are, for example, e-ink cells.

In an embodiment as claimed in claim 28, the optical separating filter separates three colors which preferably are primary colors. The display panel has pixel elements which are each associated with one of the outlet areas. Now a full color display is obtained with very high brightness efficiency.

In outdoors applications reflective displays are preferred because it is difficult to generate a sufficiently high brightness and contrast with an emissive display. The color separating filter in accordance with the invention is in particular relevant for such reflective displays to optimize their brightness. The color separating filter may be constructed as a layer on top of the display elements. In fact, the color separating filter focuses different colors on different surface areas. The display may be flat and may have pixel elements which have a transmissive and a non-transmissive state.

The color separating filter may also separate the different polarization states for use in, for example, an LCD. Usual LCD's require a polarization filter which absorbs half the impinging light. Thus a gain of a factor two is reached. In color display applications the gain is even higher. The known absorbing color filters present above each pixel element absorb an additional two-third of the impinging light. Thus the total loss is about 85 to 90%. A brighter reflective display such as E-ink has a loss of about 70%.

In an embodiment as claimed in claim 31, the color separating filter is used to separate the impinging light before it reaches different (types of) solar cells.

In accordance with the invention, reflective filters are used. The light which impinges on the reflective filters is separated into reflected light and transmitted light. The sum of the reflected light and the transmitted light is, in principle, equal to the impinging light. A property of the reflected light differs from a property of the transmitted light. For example, the colors and/or the polarization states differ. Thus, although the filters are referred to as reflective filters, it is also transmissive filters.

These and other aspects of the invention are apparent from and will be elucidated with reference to the embodiments described hereinafter.

Figure 2:
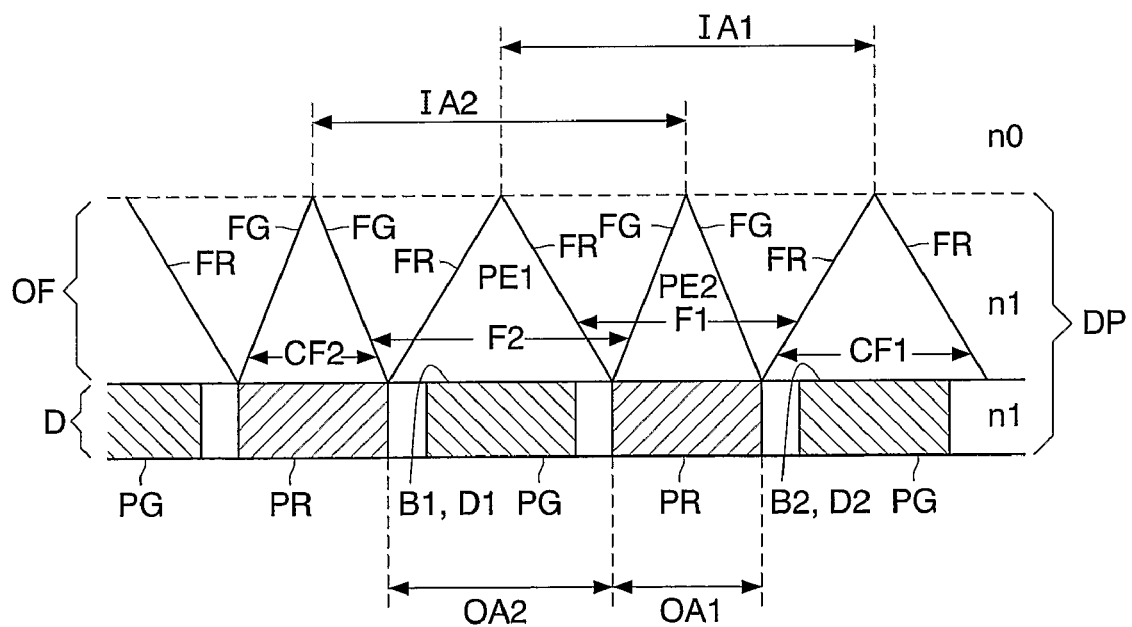
Figure 3:
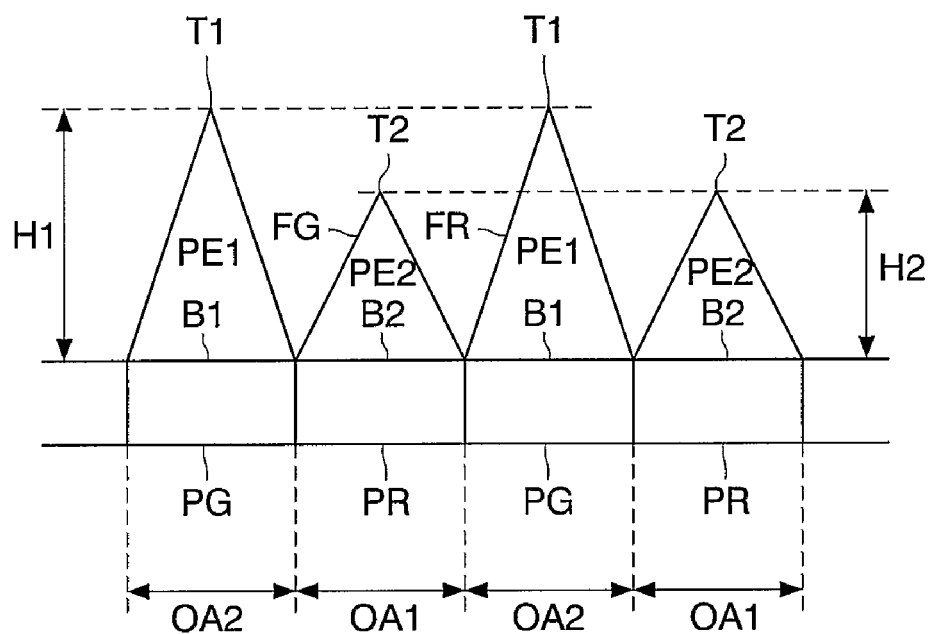
Figure 4:
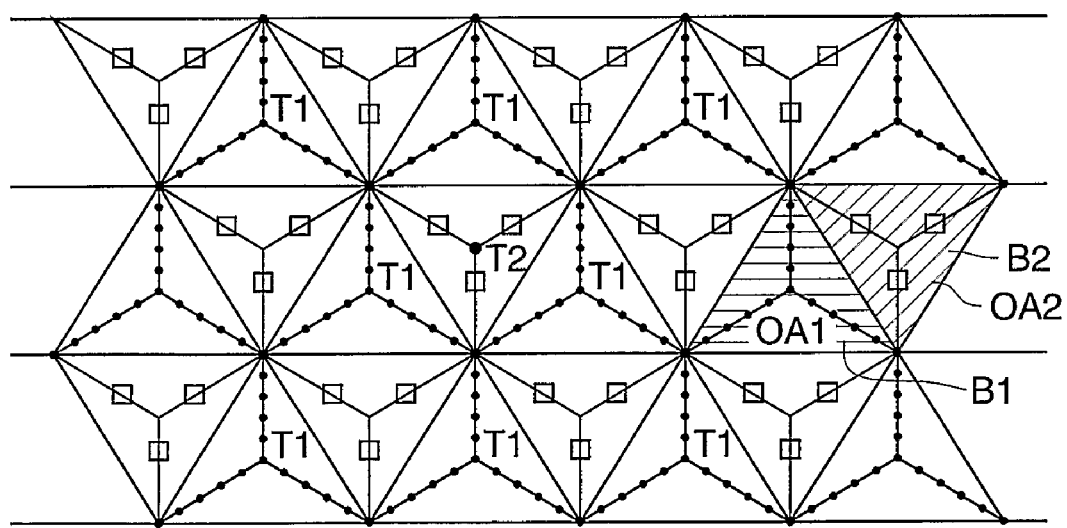
Figure 5:
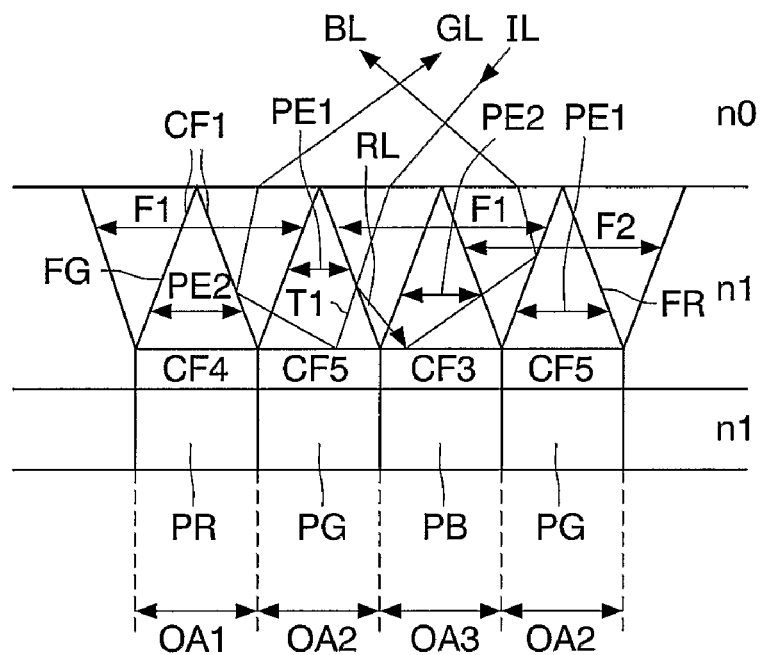
Figure 6:
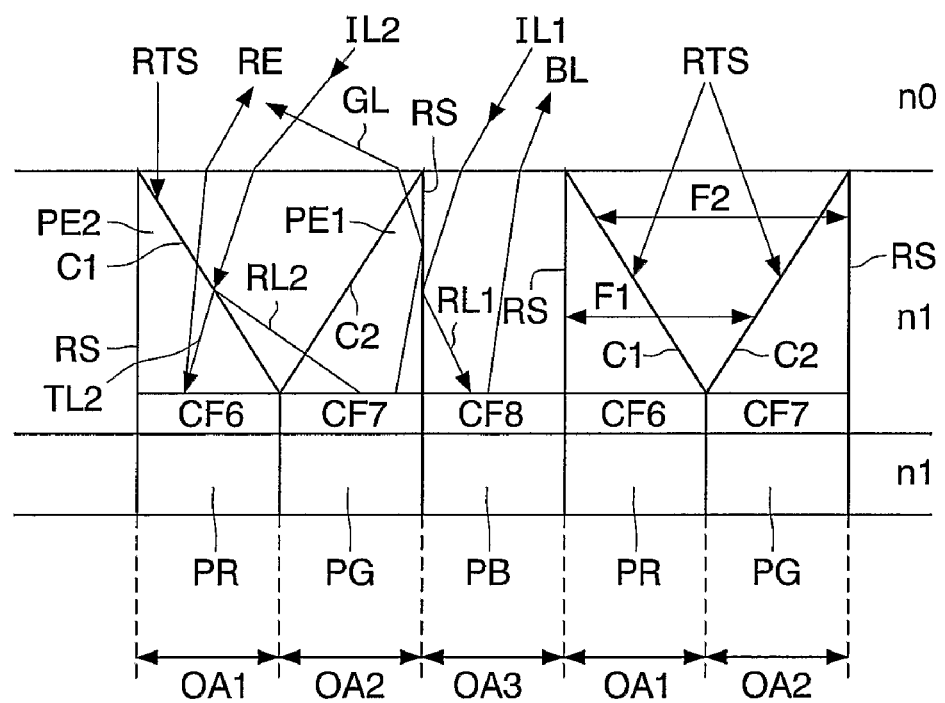
Figure 7A:
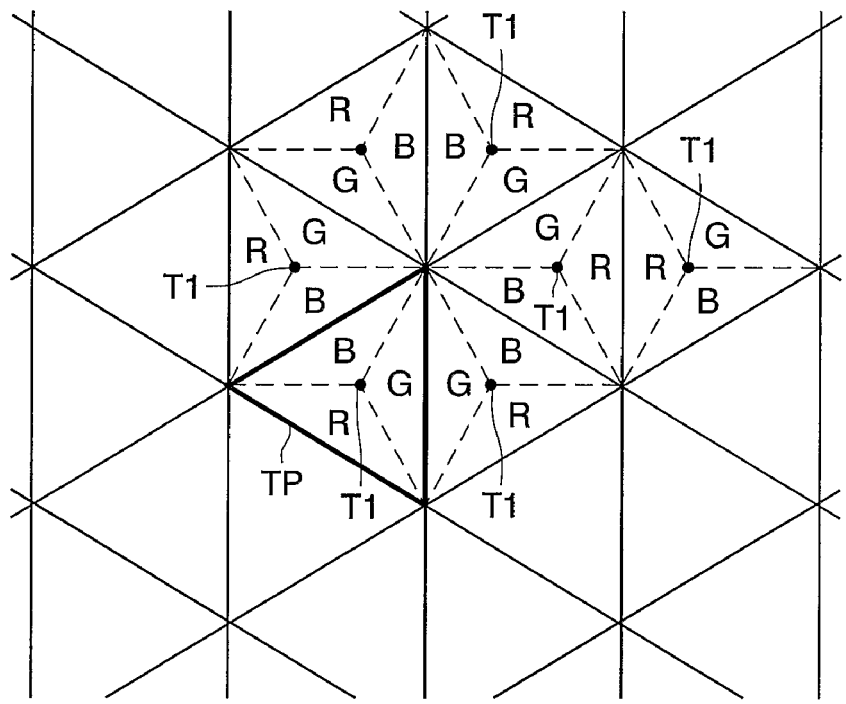
Figure 7B:
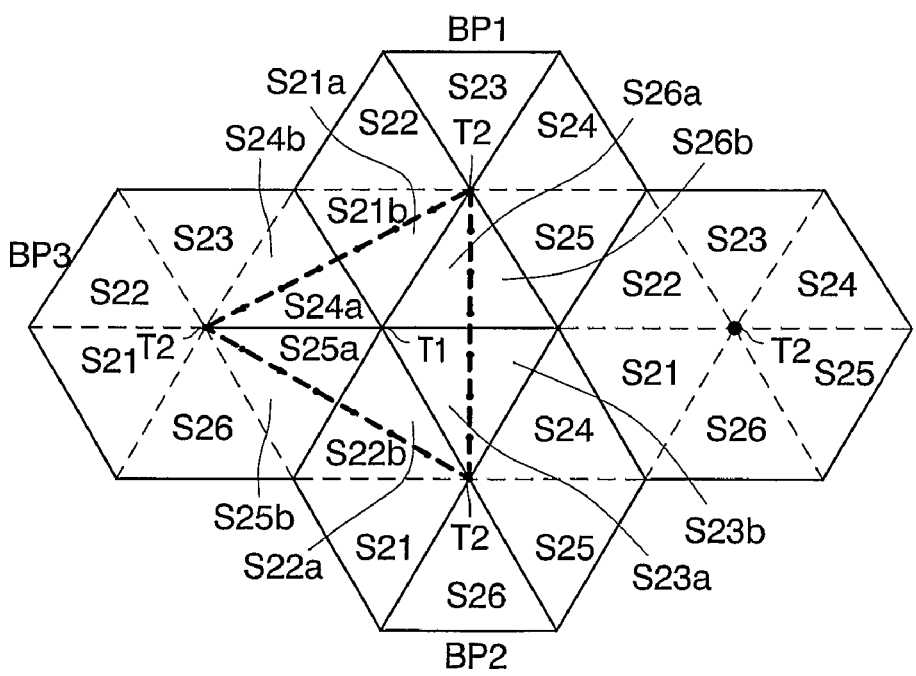
Figure 8:
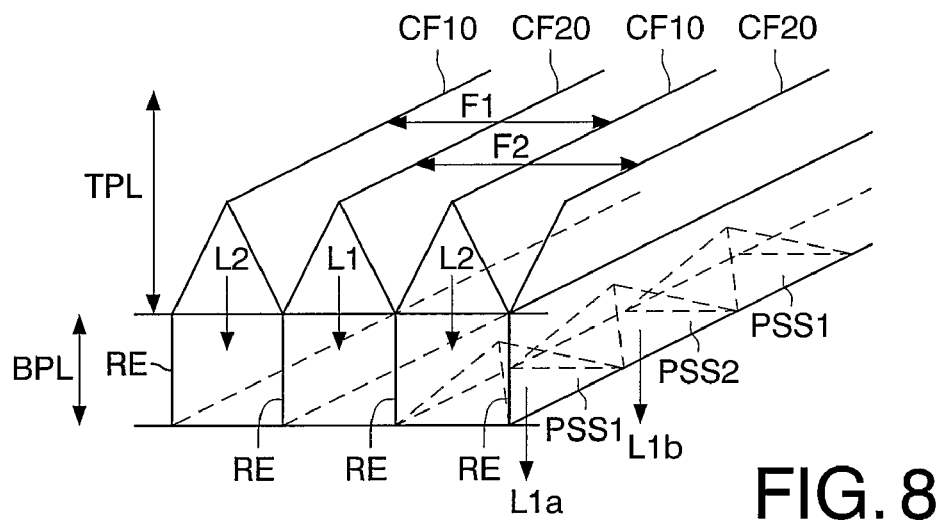
Figure 9A:
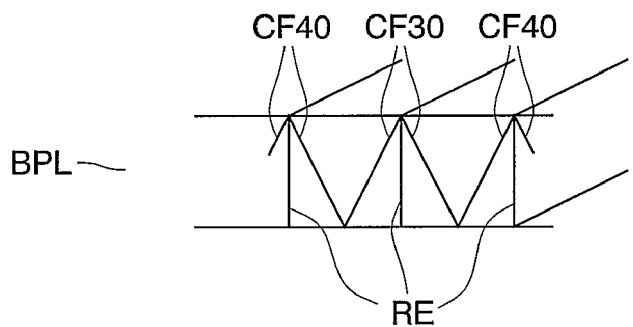
Figure 9B:
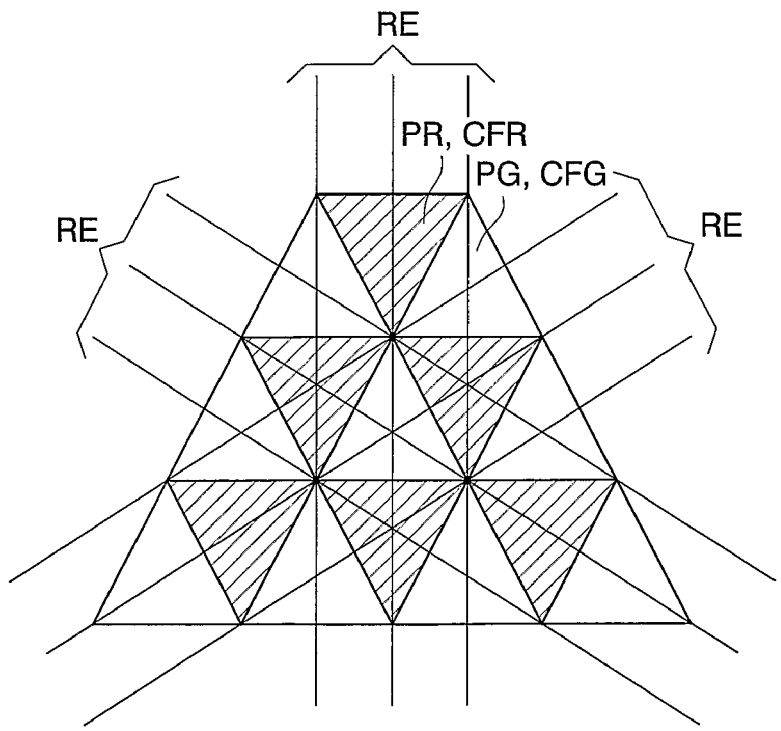
Figure 10:
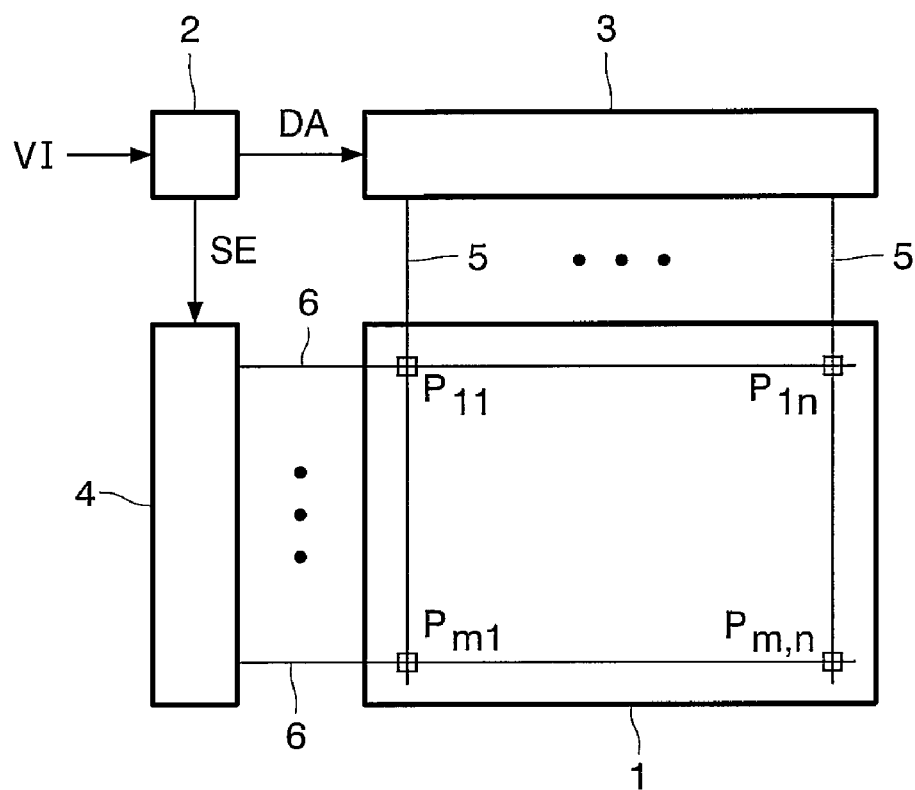
Figure 11:
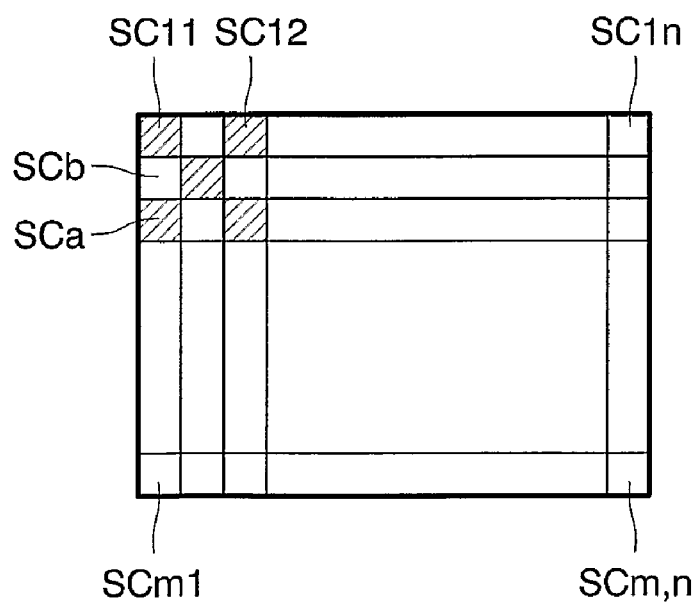
Figure 12:
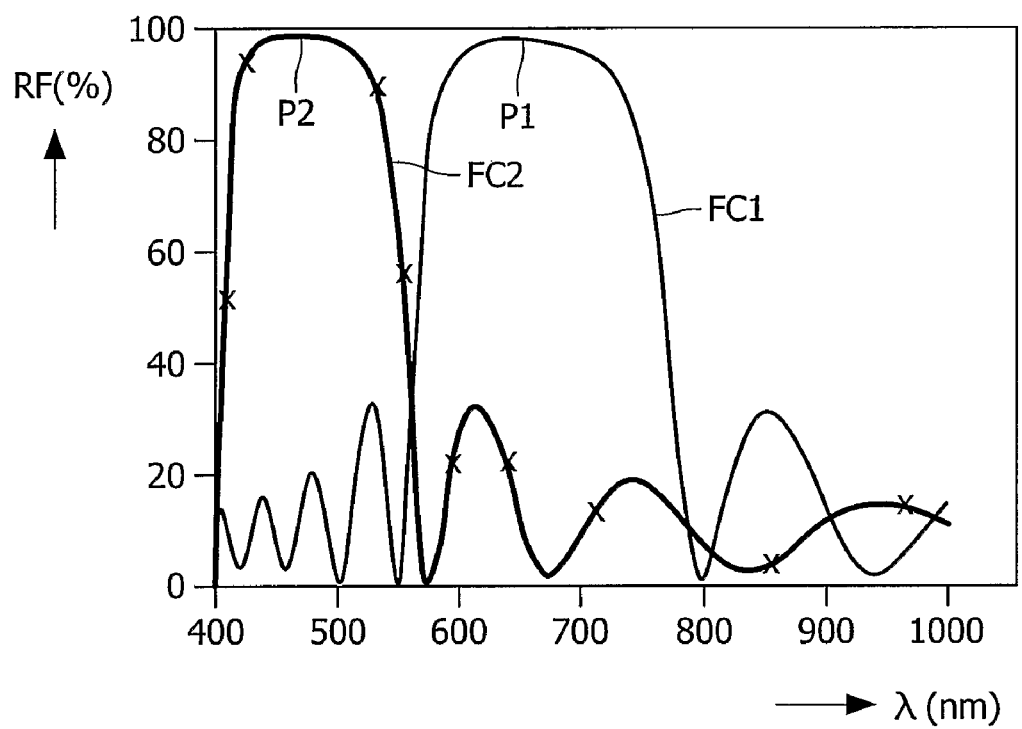
Figure 13:
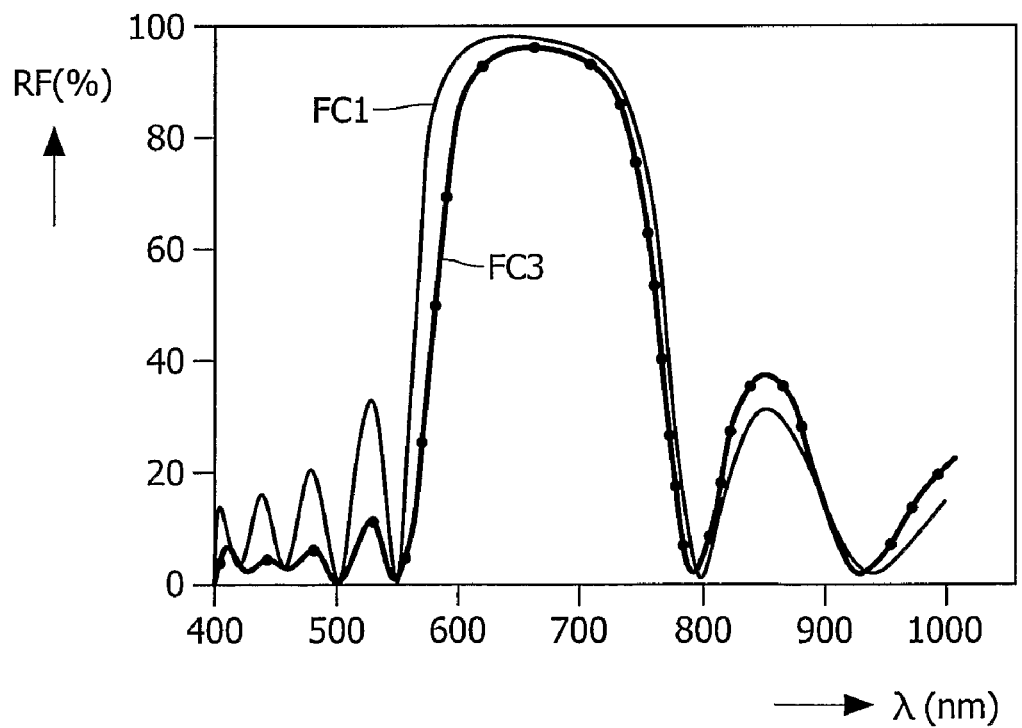
Figure 14:
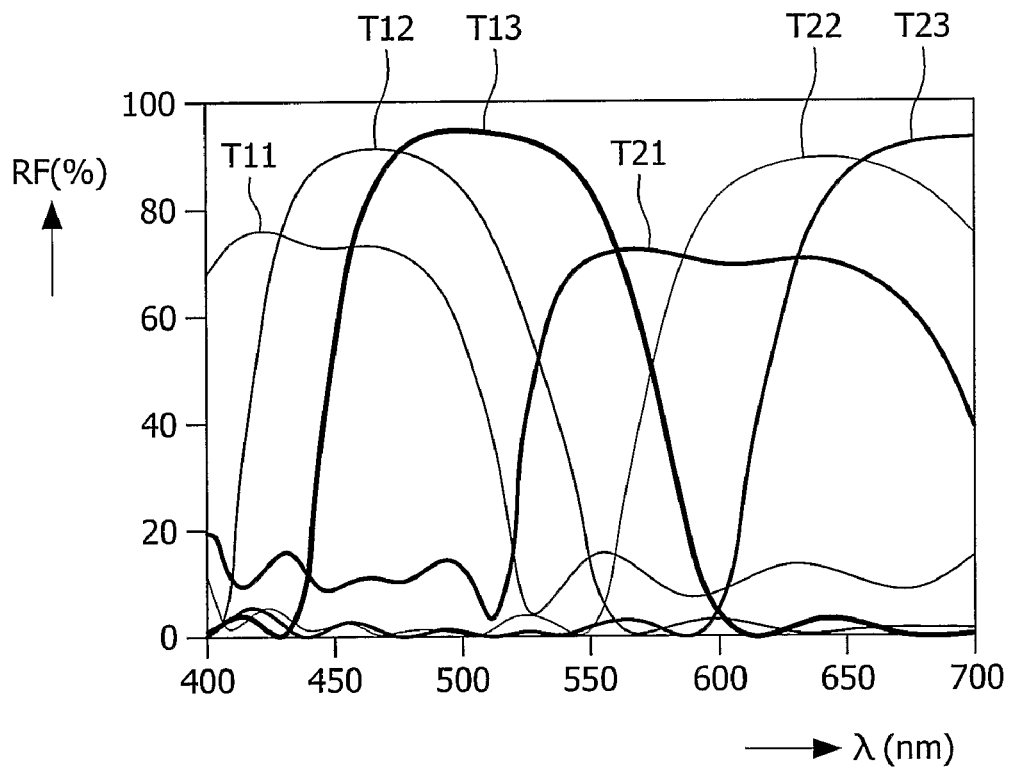
Figure 15:
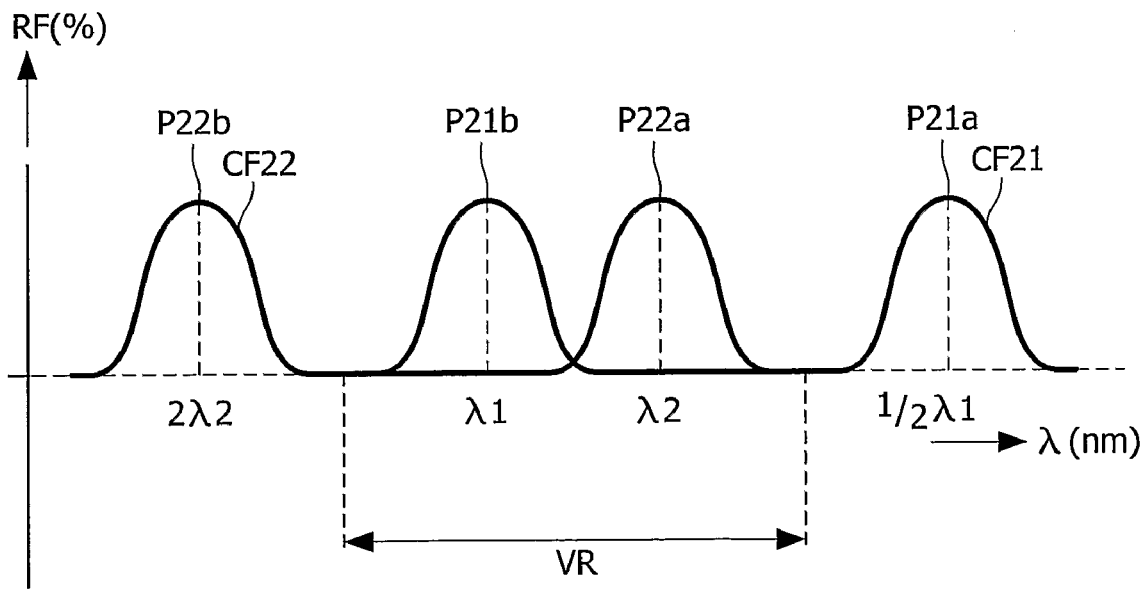

In the drawings:

FIG. 1 shows schematically a cross section of an embodiment of an optical separating filter combined with pixels of a display, FIG. 2 shows schematically a cross section of an embodiment of an optical separating filter combined with pixels of a display, FIG. 3 shows schematically a cross section of an embodiment of an optical separating filter combined with pixels of a display, FIG. 4 shows schematically a top view of an embodiment of an optical separating filter, FIG. 5 shows schematically a cross section of an embodiment of an optical separating filter having absorbing color filters at the outlet areas, FIG. 6 shows schematically a cross section of an embodiment of an optical separating filter having reflectors, FIGS. 7A and 7B show schematically a top view of a top plane and a bottom plane, respectively, of an optical separating filter which separates the impinging light into three primary colors, FIG. 8 shows schematically a perspective view of a top plane and a bottom plane of an optical separating filter with reflectors, FIG. 9A shows a perspective view of an alternative construction of the bottom plane of FIG. 8, FIG. 9B shows a top view of yet another construction of the bottom plane of FIG. 8, FIG. 10 shows a display apparatus for use with the optical separating filter, FIG. 11 shows a solar panel for use with the optical separating filter, FIG. 12 shows an example of the reflectance of optical filters with stacks of layers which have scaled layer thicknesses, FIG. 13 shows an example of the reflectance of optical filters with stacks of layers in which the different layers in the same stack have different thicknesses, FIG. 14 shows an example of the reflectance of optical filters with scaled layer thicknesses for different angles of incidence of the impinging light, and FIG. 15 shows an example of the reflectance of two optical filters with scaled layer thickness of which the second and the first order reflectance peak, respectively, are used.

FIG. 1 shows schematically a cross section of an embodiment of an optical separating filter combined with pixels of a display. A simplified optical separating filter is shown to allow an easy elucidation of its operation and the terminology used. The optical separating filter is further referred to as filter unless it is required to make a distinction with another filter. The filter is used in conjunction with pixels PR, PG of a display. The outlet areas OA1 and OA2 of the filter cooperated with the pixels PR, PG, respectively. The inlet areas IA1 are directed towards the impinging light IL. By way of example only, it is shown that the funnel like structures F1 are obtained by providing reflective filters FR on pyramidal shaped structures PE1.

The reflective filters FR reflect part of the impinging light IL as reflected impinging light RL towards the outlet areas OA1. The reflected light RL has a first property C1. For example, the reflected light RL has a first color dependent on the part of the visible spectrum which is reflected. The funnel like structures F1 concentrate the part of the impinging light IL which is reflected towards the associated outlet areas OA1.

The reflective filters FR transmit another part of the impinging light IL as transmitted light TLG. For example, this transmitted light TLG has a second color different than the first color. The second color depends on the part of the visible spectrum which is transmitted. Alternatively, the reflected light RL may have a first polarization state and the transmitted light TLG may have a second polarization state different than the first polarization state. In a preferred embodiment the first and the second polarization states are perpendicular with respect to each other. The polarization states are, for example, the polarization direction or left or right circular (or elliptical) polarization.

The pyramidal shaped structures PE1 have base planes B1 which cooperate with the associated outlet areas OA2 and in the embodiment shown with the pixels PG. The pyramidal shaped structures PE1 have a top T1 which is directed away from the outlet areas OA2 towards the impinging light IL. The pyramidal shaped structures PE1 cover the outlet areas OA2 and thus form a color filter CF1 on top of these outlet areas OA2.

Consequently, due to the reflective property of the reflective filters FR and their funnel like geometry, the light with the first property C1 is concentrated towards the first outlet areas OA1. And, due to the transmissive property of the reflective filters FR and the fact that they are covering the second outlet areas OA2, only the light with the second property is able to reach the second outlet areas OA2. In this simplified structure, the impinging light is able to directly reach the first outlet areas OA1 and thus the color separation towards the different pixels PR and PG is not optimal. It is possible to add a color filter at the first outlet areas OA1 such that, for example, only light with the first property reaches the first outlet areas OA1. Such an extra color filter may be a flat absorbing filter provided on top of the pixels PR. But, preferably, the color filters on top of the pixels PR are pyramidal shaped as shown in FIG. 2 such that further the light which has the second property is reflected and concentrated towards the pixels PG.

It has to be noted that the exact geometry of the funnel like structures F1 is not important to the invention. What counts is that the geometry is such that the reflected light RL is concentrated towards the associated outlet areas OA1 by the reflective filter funnel like geometry. Preferably, the funnel like structures F1 are formed by pyramidal structures PE1 which have a base plane directed towards the other outlet areas OA2 such that they form a color filter towards these other outlet areas OA2. The boundaries or walls of the pyramidal structures (further also referred to as pyramids) PE1 concentrate the reflected light towards the outlet areas OA1. Preferably, the refractive index n1 of the material used for the pyramids PE1 is sufficiently larger than the refractive index n0 of the material (usually the air) the impinging light IL is traveling in. This, together with the funnel shape, causes a concentration of the transmitted light TLG towards the outlet areas OA2. Preferably, the material of the pixels PG, PR has a refractive index n1 identical to the refractive index n1 of the pyramids PE1.

The base plane B1 may have any suitable form, such as, for example, a rectangle to form ridges, a square to form four sided pyramids, a triangle to form the well know three sided pyramids, or a polygon with more than four vertices to form pyramids with more than four sides. Although optimal, it is not required that the top of the pyramids PE1 is pointed it may be flat. However the cross section through the pyramid PE1 parallel to the base plane B1 should decrease from the base towards the top T1. The side planes of the pyramids need not be flat, but may be concave or convex. The pyramids PE1 must not be symmetrical; the projection of the top T1 need not coincide with the centre of the base plane B1. The base plane B1 need not be exactly as large as the area covered by the pixel PG. Preferably, the base plane B1 is not smaller than the active pixel area. The pyramids PE1 may be made of a transparent material on which the reflective filters FR are provided as a layer. The funnels in-between the pyramids PE1 may be empty or may be filled with a material which has a reflective index which preferably is either equal to the reflective index n1 of the material of the pyramids PE1 or lies somewhere in-between n0 and n1. A higher refractive index is also possible, but will degrade the performance of the filter.

FIG. 2 shows schematically a cross section of an embodiment of an optical separating filter combined with pixels of a display. The optical separating filter OF and the pixels PR, PG of the display D are based on the construction shown in FIG. 1. Now, an optional free space is present between the pixels PR, PG, and the pyramidal shaped color filters CF2 are added. Again, the funnel shaped structures F1 are provided by the reflective filters FR on side walls of the pyramids PE1 of which the base planes B1 are associated with the outlet areas OA2 which covers the area of the pixels PG. The funnel shaped structures F2 are provided by the reflective filters FG on side walls of the pyramids PE2 of which the base planes B2 are associated with the outlet areas OA1 which covers the area of the pixels PR. The inlet area of the funnels F1 is denoted IA1, the inlet area of the funnels F2 is denoted IA2. The combination of the optical separating filter OF and the display D is referred to as the display panel DP. Although FIG. 2 shows output areas OA1, OA2 and pixels PR, PG which have equal dimensions, this is not essential.

The base planes B1 have dimensions D1 and the base planes B2 have dimensions D2 smaller than the dimensions D1. Due to the different dimensions D1, D2 of the base planes B1, B2, the angles the side walls of the pyramids PE1, PE2 make with the base plane are different. If the filter layers FR, FG are evaporated onto the walls of the pyramids PE1, PE2, due to the different angles a different thickness of the layers of the filters FR, FG will result. These different thicknesses give rise to different optical filtering characteristics. The reflective filter FR reflects light which has a first property C1 and transmits light which has a second property C2. The reflective filter FG reflects light which has the second property C2 and transmits light which has the first property C1. Consequently, the reflective filters FR concentrate light which has the first property towards the pixels PR via the reflective filters FG which are transmissive for light with the first property C1. The reflective filters FG concentrate light which has the second property C2 towards the pixels PG via the reflective filters FR which are transmissive for light with the second property C2. Thus, ideally, only light which has the first property C1 is able to reach the pixels PR, and only light which has the second property C2 is able to reach the pixels PG. In principal, all the impinging light can be used; it is not absorbed in absorbing color filters but is separated in two light streams with different properties which are completely used. Consequently, the brightness of a display D used with the optical separating filter OF in accordance with the invention is much higher than in conventional display panels DP wherein absorbing color filters are used per pixel. Due to its symmetrical structure, the dependence on the angle of the impinging light with respect to the structure is optimal.

Preferably, the pyramids PE1, PE2 and the pixels PR, PG have an identical refractive index n1 which is higher than the refractive index n0 of the surrounding medium. The area between the pyramids PE1, PE2 may be filled by transmissive material with the refractive index n1, or may be empty and thus have the refractive index n0 or may have a refractive index between n0 and n1. Usually the pyramids PE1, PE2 are protected by adding a transmissive plate (not shown) on top of them.

By way of example only, the filters FR may reflect red light while the rest of the (visible) spectrum is transmitted, and the filter FG may transmit the red light while the rest of the spectrum is reflected.

FIG. 3 shows schematically a cross section of an embodiment of an optical separating filter combined with pixels of a display. The optical separating filter shown in FIG. 3 is based on the filter OF shown in FIG. 1. In the same manner as shown in FIG. 2 pyramidal structures PE1 are present above the outlet areas OA2 and thus the pixels PG, and pyramidal structures PE2 are present above the outlet areas OA1 and thus the pixels PR. The pyramids PE1 have a height H1 which is larger than a height H2 of the pyramids H2. Due to the difference in height, the angles of the side planes of the pyramids PE1 with their base plane B1 are larger than the angles of the side planes of the pyramids PE2 with their base planes B2. Again, a thickness of a layer of evaporated material for forming the reflective filters FR and FG will differ and thus the optical filter characteristics will differ. Preferably, the different pyramids PE1, PE2 have different top angles which are selected to fulfill the next equation 0.5<sin (top angle of pyramid PE1)/sin (top angel of pyramid PE2)<=2.0. If this ratio is 1.0, the pyramids PE1 and PE2 are equal and the color filters have to be made in a different manner. If this ratio is 2.0, the difference in wavelength is about a factor 2. Preferably, this ratio is in the ranges 0.625 to 0.8 or 1.25 to 1.6. The abbreviation sin stands for sinus.

FIG. 4 shows schematically a top view of an embodiment of an optical separating filter. The straight lines without marking show the boundaries of the output areas OA1 or the base planes B1 and of the output areas OA2 or the base planes B2 of the pyramidal shaped structures PE1, PE2, respectively. The pyramids PE1 have tops T1 and the pyramids PE2 have tops T2. The corner lines of the side planes of the pyramids PE1 are indicated by small dots, the corner lines of the side planes of the pyramids PE2 are indicated by small squares. It has further to be noted that all side planes of the pyramids PE1 reflect light which has the first property C1 and transmit light which has the second property C2, and that all side planes of the pyramids PE2 reflect light which has the second property C2 and transmit light which has the first property C1.

FIG. 5 shows schematically a cross section of an embodiment of an optical separating filter having absorbing color filters at the outlet areas. The construction shown in FIG. 5 is based on the construction shown in FIG. 2. The same references in FIG. 5 and FIG. 2 refer to the same items having the same function. Now, the second pyramidal structures PE2 are present above pixels denoted by PR and PB. The first pyramidal structures PE1 are again present above the pixels denoted by PG. Now, by way of example, all the bases B1, B2 of the pyramids PE1 and PE2 have the same dimensions, and there is no free space between the pixels PR, PB, PG. It has to be noted that although the pixels PR, PB, PG are referred to with different references, in fact the construction of the pixels PR, PB, PG may be identical, it is only the property of the light impinging on the pixel and/or reflected by the pixel which differs. Further, now color absorbing filters CF3, CF4, CF5 are added to filter the light directed towards the pixels PB, PR, PG, respectively.

In the now following the operation of the shown construction is elucidated. By way of example only, between brackets, the items are elucidated if the pixels PB, PR, PG have to transmit or reflect the primary colors blue B, red R, and green G, respectively. In the example shown, the impinging light IL which impinges on the reflective filter FR of the pyramid PE1 above the pixel PG is reflected as reflected light RL with the first property C1 (comprises colors R and B) through the reflective filter FG (transmits colors R and B) of the neighboring pyramid PE2 and the color filter CF3 (absorbs color R and transmits color B) towards the pixel PB. The property of the light BL (color B) reflected back by the pixel PB is changed because the color filter CF3 is only transmissible for part of the spectrum (color B). The light BL which impinges on a neighboring pyramid PE1 is reflected by the reflective filter FR (reflects colors R and B) towards the viewer.

The impinging light IL which impinges on the reflective filter FR of the pyramid PE1 above the pixel PG is transmitted through the pyramid PE1 as the transmitted light TL which has the second property (color G). The transmitted light reaches the pixel PG via the optional absorbing filter CF5 (transmitting color G or a limited spectrum of the color G only, absorbing other colors). The filter CF5 may improve the color point of the primary color G. The light reflected back by the pixel PG may hit the filter FG (which reflects the color G) on the neighboring pyramid PE2 and is reflected towards the viewer.

The light reflected by the pyramids PE1 towards the pixels PR (not shown) has again the first property C1 (comprises the colors R and B). The absorbing filter CF4 (transmits the color R and absorbs the color B) filters the light with the property C1 such that the pixel PR is only active for light with a fourth property (the color R only).

FIG. 6 shows schematically a cross section of an embodiment of an optical separating filter having reflectors. The same references in FIG. 6 and FIG. 5 refer to the same items having the same function. The reflectors RS are reflective for both light which has the first property and for light which has the second property. In the embodiment shown, the pixels alternate in the order PR, PG, PB. For the ease of elucidation, and by way of example only, it is assumed that the pixels PR, PG, PB have to modulate the red R, green G, and blue B light, respectively. Absorbing color filters CF6 and CF7 are present in-between on the one hand the bases of the pyramidal structures PE2 and PE1, respectively, and on the other hand the pixels PR and PG, respectively. The absorbing color filter CF8 is present on top of the pixel PB. The reflectors RS are flanking the blue pixel PB and preferably extend substantially perpendicular with respect to the plane comprising the pixels PR, PB, PG. The pyramidal structures PE1 and PE2 are in fact half the pyramidal structures of FIG. 5. The output areas OA1, OA2, OA3 correspond to the areas of the pixels PR, PG, PB, respectively. The reflective color filters C1 and C2 are collectively referred to as the reflective filters RTS.

The operation of the construction shown is elucidated in the now following. The impinging light IL1 impinges on the display panel above the blue pixel PB at a predetermined angle, reflects against the reflector RS as the reflected light RL1. The reflected light RL1 is filtered by the absorbing filter CF8 such that only the color blue (in fact, usually a part of spectrum in the blue area) is transmitted towards the pixel PB. The amount of blue light BL reflected by the pixel PB towards the viewer depends on the optical state of the pixel PB.

The impinging light IL2 impinges on the display panel above the area formed by the red and green pixels PR, PG, respectively. The impinging light IL2 impinges on the reflective color filter C1 above the pixel PR. The filter C1 reflects green light RL2 and transmits red and blue light TL. The red light TL may contain part of the spectrum covering more than red light only, the absorbing filter CF6 will transmit the desired red part of the spectrum. The amount of red light RE reflected by the pixel PR towards the viewer depends on the optical state of the pixel PR. The reflected green light RL2 passes the reflective filter C2 above the pixel PG. The filter C2 reflects red light and transmits green and blue light which may contain part of the spectrum covering more than green light only. The absorbing filter CF7 will transmit the desired green part of the spectrum to the pixel PG. The amount of green light GL reflected by the pixel PG towards the viewer depends on the optical state of the pixel PG.

In this embodiment, the funnel like structure F1 is formed by the reflective color filter C2 and its opposing reflector RS, and the funnel like structure F2 is formed by the reflective color filter C1 and its opposing reflector RS. Again the funnel like structures F1 and F2 converge the light towards their respective pixels PG, PR, respectively. If the filter C1 has a sufficient small transmissive band for red light, the filter CF6 may be omitted. If the filter C2 has a sufficient small transmissive band for green light, the filter CF7 may be omitted. It is possible to use other different colors for the filters C1, CF6, C2, CF7 and CF8 and still provide a multicolor display. Dependent on the application, any one or several of the filters C1, CF6, C2, CF7 and CF8 may be a polarizing filter instead of a color filter.

FIGS. 7A and 7B show schematically a top view of a top plane and a bottom plane, respectively, of an optical separating filter which separates the impinging light into three primary colors. This structure comprises a stack of two planes of reflective filters which are arranged into pyramidal shaped structures. The top plane and the bottom plane may actually be two different layers or plates, but may also be a single layer or plate.

The top plane shown in FIG. 7A comprises pyramids with triangular bases as shown by the non-dashed lines. The base of the pyramid TP has bold lines to clearly show its shape. The bases are directed towards the viewer. The tops T1 of the pyramids are directed away from the viewer. The corner lines of the pyramids are indicated by the dashed lines. The color of the reflective filters on the side planes of the pyramids are indicated by R, G, and B. The filters indicated by R reflect red light and transmit (or are transparent for green and blue light). The filters indicated by G reflect green light and are transparent for red and blue light, the filters indicated by B reflect blue light and are transparent for red and green light.

The bottom plane shown in FIG. 7B comprises hexagonal pyramids with tops T2 directed towards the viewer. These tops T2 are positioned in-between the tops T1 such that the pyramids of the top plane and the bottom plane fit in-between each other. The borders of the bases of the pyramids of the bottom plane are indicated by the non-dashed lines. The dashed lines indicate the corner lines of the pyramids. The six side planes of the pyramids are referred to as S21 to S26. To further elucidate the position of the pyramids of the bottom plane with respect to the top plane the position of the base of the pyramid TP of the top plane is indicated by dashed lines to which small dots have been added. As can be seen in FIG. 7B, the side planes of the pyramids BP1, BP2, BP3 of the bottom plane cooperate with two different colored side planes of the top pyramids. The part of side planes S21 to S26 which are associated with the top pyramid TP shown are indicated by S21a to S26a, the remaining parts of these side walls are indicated by S21b to S26b. Several possibilities exist to select the reflective color filters of the bottom plane.

In a first example, the side planes of the bottom plane pyramids BP1, BP2 and BP3 may have cyan, yellow and magenta filters, respectively. The cyan filter is transparent to red light and reflects green and blue light, the yellow filter is transparent to blue light and reflects green and red light, and the magenta filter is transparent for green light and reflects blue and red light.

The operation of the optical separating filter comprising the top plane of FIG. 7A and such a bottom plane is elucidated in the now following. The green filter on the pyramid TP in the top plane (further referred to as the top pyramid TP or the pyramid TP) transmits red and blue light to the segments S23a and S26a of the pyramids BP2 and BP1, respectively. The cyan filter of the segment S26a transmits the red light to the underlying pixel and reflects the blue light. The yellow filter of the segment S23a transmits the blue light to the underlying pixel and reflects the red light. The red filter on the pyramid TP transmits green and blue light to the segments S22a and S25a of the pyramids BP2 and BP3, respectively. The yellow filter of the segment S22a transmits the blue light to the underlying pixel and reflects the green light. The magenta filter of the segment S25a transmits the green light to the underlying pixel and reflects the blue light. The blue filter on the pyramid TP transmits green and red light to the segments S21a and S24a of the pyramids BP1 and BP3, respectively. The cyan filter of the segment S21a transmits the red light to the underlying pixel and reflects the green light. The magenta filter of the segment S24a transmits the green light to the underlying pixel and reflects the red light. Consequently, the pixel corresponding to the segments S21a and S26a acts as a red pixel, the pixel corresponding to the segments S22a and S23a acts as blue pixel, and the pixel corresponding to the segments S24a and S25a acts as a green pixel. Thus, the bases of the pyramids BP1, BP2, BP3 correspond to red, blue, green pixels, respectively.

In another example, the side planes of the bottom plane pyramids BP1, BP2 and BP3 have alternating different reflective color filters per pyramid. The pyramid BP1 has blue and green reflective filters, the side planes S21, S23 and S25 have the blue reflective filters, and the side planes S22, S24 and S26 have the green reflective filters. The side planes S21, S23, S25 of the pyramid BP2 have red reflective filters; the side planes S22, S24, S26 of the pyramid BP2 have green reflective filters. The side planes S21, S23, S25 of the pyramid BP3 have blue reflective filters; the side planes S22, S24, S26 of the pyramid BP3 have red reflective filters. The color properties of the reflective filters used in the bottom plane may be identical to those used in the top plane.

The operation of the optical separating filter comprising the top plane of FIG. 7A and such a bottom plane is elucidated in the now following. The green filter on the pyramid TP in the top plane transmits red and blue light to the segments S23a and S26a of the pyramids BP2 and BP1, respectively. The blue filter of the segment S26a transmits the red light to the underlying pixel and reflects the blue light. The red filter of the segment S23a transmits the blue light to the underlying pixel and reflects the red light. The red filter on the pyramid TP transmits green and blue light to the segments S22a and S25a of the pyramids BP2 and BP3, respectively. The green filter of the segment S22a transmits the blue light to the underlying pixel and reflects the green light. The blue filter of the segment S25a transmits the green light to the underlying pixel and reflects the blue light. The blue filter on the pyramid TP transmits green and red light to the segments S21a and S24a of the pyramids BP1 and BP3, respectively. The green filter of the segment S21a transmits the red light to the underlying pixel and reflects the green light. The red filter of the segment S24a transmits the green light to the underlying pixel and reflects the red light. Consequently, the pixel corresponding to the segments S21a and S26a acts as a red pixel, the pixel corresponding to the segments S22a and S23a acts as blue pixel, and the pixel corresponding to the segments S24a and S25a acts as a green pixel. Thus, the bases of the pyramids BP1, BP2, BP3 correspond to red, blue, green pixels, respectively.

Many alternative constructions are possible. The bases of the pyramids may have other shapes than triangular, for example, rectangular, square, and hexagonal. It is not required that the side walls of the top pyramids TP and the bottom pyramids BP1 to BP3 are touching each other, the corresponding side walls of opposing pyramids need not run in parallel. The reflective color filters may have other colors. It only counts that the color filters of the side walls of the top pyramids TP and the bottom pyramids BP1 to BP3 are selected to cooperate which each other such that at least three different colors are directed to the pixels.

FIG. 8 shows schematically a perspective view of a top plane and a bottom plane of an optical separating filter with reflectors. The top plane TPL comprises a color separating filter which separates the impinging light IL into two segments L1, L2 of the spectrum (for ease of elucidation also referred to as two colors). The funnel shaped structures F1, F2 are now obtained by providing elongated ridge like structures which comprise the first and the second reflective filters CF10, CF20 in an alternating sequence. This structure operates equivalently to the structures shown in FIGS. 2 and 3. In fact, also the same structures shown in these Figures may be used, but instead of pyramids now ridge like structures are used.

The bottom plane BPL has to comprise further reflective color filters which are positioned such that the first color light L1 and/or the second color light L2 are further separated into two sub-segments of the spectrum such that three or four different sub-segments (also referred to as colors) are obtained. Instead, some of the color filters may be replaced by reflective polarizing filters which reflect the light with a first polarization state and is transmissive for light with another polarization state. The bottom plane BPL comprises reflectors RE which are arranged to keep the first color light L1 and the second color light L2 separated. In the embodiment shown, the reflectors RE extend in the same direction as the ridges and are positioned in-between the two filters CF10 and CF20.

If the light has to be separated into three colors, no further color separating filters are required below one of the color filters while a further color separating structure is required below the other color filter CF10. The further color separating structure is present between two adjacent reflectors RE and may have a construction as elucidated before. In the embodiment shown in FIG. 8, the further color separating structure comprises pyramidal shaped structures PSS1, PSS2 with different reflective color filters to separate the light L1 into two sub-segments L1a an L1b. If the light has to be separated into four colors, further color separating filters are required below both the color filters CF10 and CF20.

For example, the filter CF10 is a red filter which reflects red light and which transmits blue and green light, the filter CF20 is a green filter which reflects green light and which transmits red and blue light. In the compartment below the filter CF20 formed by two adjacent reflectors RE, an absorption filter may be present to absorb the blue light, such that only red light leaves this compartment, for example to a pixel which modulates the amount of red light reflected back to the viewer. In the compartment below the filter CF10, a color separating filter is present to separate the blue and green light. Thus, blue and green reflective filters should be present which reflect blue and green light, respectively and which transmit red and green light and red and blue light, respectively.

Alternatively, the pyramids shown may be replaced by ridge like structures which extends in a direction different than the direction the ridge like structures of the top plane TPL are extending in. Preferably, the ridge-like structures of the bottom plane BPL extend in a direction perpendicular to the ridge like structures of the top plane TPL. These ridge-like structures are preferred over the embodiment using pyramids as is shown in FIG. 8.

FIG. 9A shows a perspective view of an alternative construction of the bottom plane of FIG. 8, FIG. 9B shows a top view of yet another construction of the bottom plane of FIG. 8. It has to be noted that, for the sake of clarity, the construction shown in FIG. 9A is rotated over 90 degrees. The reflectors RE of the bottom plane BPL have to extend in another direction than (preferably perpendicular to) the ridges of the top plane TPL.

FIG. 9A shows a bottom plane with the reflectors RE which extend in a direction perpendicular to the ridge shaped filters CF10, CF20 on the top plane TPL of FIG. 8. The bottom plane BPL now further comprises ridge like structures to form further reflective color filters CF30 and CF40. Preferably, the reflectors are perpendicular to plane in which the bottom plane BPL extends.

For example, if the same red filter CF10 and green filter CF20 are used in the top plane TPL, again blue and green filters CF30, CF40 can be used in the bottom plane BPL.

FIG. 9B shows a bottom plane in which the different pyramids PR, PG with the different reflective color filters CFR, CFG have a geometry such that the light reflected by one of the pyramids is directed to pyramids of which have the other color filter. FIG. 9B shows a particular embodiment wherein the bases of the pyramids are triangles, but a lot of other shapes of the bases may be selected to obtain the same effect. In the example shown, the filters are red R and green G reflective filters. Any other colors or polarization states instead of colors may be used. The reflectors RE section the pyramids to form compartments which each comprise two different reflective color filters CFR, CFG which reflect light towards each other. Preferably, the filters CFR, CFG are symmetrically positioned in the compartments. Such a bottom plane BPL can also be used without a top plane TPL as an alternative of the structure shown in FIG. 4.

FIG. 10 shows a display apparatus for use with the optical separating filter. The display apparatus comprises a display 1 which an array of pixels of which P11, P1n, Pm1 and Pmn are shown. The pixels are associated with crossings of select electrodes 6 and data electrodes 5. A select driver 4 supplies select signals to the select electrodes 6, a data driver 3 supplies data signals to the data electrodes 5. A processing and control circuit 2 receives the input video signal V1 to be displayed on the display 1, supplies a signal DA to the data driver 3 and a signal SE to the select driver 4. Usually, the signal DA comprises data representing the input video signal V1 and timing signal to synchronize the supply of the data signals to the data electrodes 6 with the input video signal V1. The signal SE comprises timing information to synchronize the supply of the select signals to the select electrodes 6 with the supply of the data signals. Usually, the rows of the display 1 are selected one by one while the data signals are supplied to the selected row in parallel.

FIG. 11 shows a solar panel for use with the optical separating filter. The solar panel comprises solar cells SC11 to SCmn divided into two different types of solar cells indicated by SCa (the dashed areas) and SCb (the non-dashed areas). By way of example only, the solar cells SCa and SCb are square shaped alternate each other in the row and column direction. The solar cells SC11 to SCmn may have other shapes and need not be arranged in a matrix. The optical separating filter may separate the impinging light into two color ranges optimally tuned to the sensitivity color ranges of the different solar cells.

The color separating filters in accordance with the invention make use of the difference in refractive indices n0 of the surroundings and n1 of the material used to provide the funnel structures F1, F2. In one dimension it is possible to reduce the surface by $n1/n0*\sin(\alpha)$ while all the light will still reach the outlet area, wherein $\alpha$ is the angle the funnels F1, F2 and thus the reflective filters CF1, CF2 make with the plane of the outlets OA1, OA2. This is based on the fact that light bends towards the normal of a plane when entering a material with a higher refractive index. A further reduction of the surface area of the outlet an amount of the impinging light will be reflected back and never reaches the bottom of the funnel. Thus, if the height of the funnels is large, and the angle a reaches 90 degrees, the maximum compression in one dimension is a factor n1/n0. In practical embodiments, this compression ratio is 1.5. However if special materials are used with high refractive indices the maximum compression ratio can be larger. In two dimensions a compression of $(n1/n0)^2$ is possible. For separating two colors a ratio of refractive indices of 1.42 is required, for separating three colors a ratio of refractive indices of 1.73 is required. Thus, preferably, the ratio of the inlet area of the funnel and the outlet area of the funnel is not larger than these compression factors. This means that if a practical ratio of refractive indices of 1.5 is reachable, only two colors can be separated within a single plane of filters. If a material with a sufficient high refractive index n1 is used, three colors can be separated with a single plane of filters.

It is possible to partially separate the colors with the separating filter in accordance with the invention, and to add absorbing color filters to absorb the unwanted colors. Although part of the light efficiency is lost, it still is an improvement over using color absorption filters above each pixel without the color separating filter of the invention.

FIG. 12 shows an example of the reflectance of optical filters with stacks of layers which have scaled layer thicknesses. The reflectance RF is indicated as a percentage along the vertical axis, the wavelength of the light is indicated along the horizontal axis by λ in nm (nanometer). A reflective color filter may be created by making a stack of alternating layers which comprise materials with a different refractive index. For example, one of the layers is made of $SiO_2$ and the other one of $Ta_2O_5$. However, any other suitable materials may be used as long as their refractive indexes differ, and they are transmissive to light. In general, the periodicity of the stack, which is determined by the sum of the optical thickness of one $SiO_2$ layer and one $Ta_2O_5$ layer, determines the wavelength at which the reflectance of the stack of layers has a maximum.

An example is shown in FIG. 12, the reflectance FC1 is shown as a function of the wavelength λ of the incident light for a stack of 15 layers using alternating layers of $SiO_2$ and $Ta_2O_5$ with thicknesses of 111.63 nm and 77.27 nm, respectively. The first order peak P1 of the reflectance function FC1 is positioned at the wavelength of 650 nm at which the sum of optical thicknesses of the two layers is exactly 0.5 wavelengths. The sum of the optical thickness is the sum of the physical thickness multiplied by the respective refractive index. The reflectance FC2 is shown as a function of the wavelength λ of the incident light for a stack of 15 layers using alternating layers of $SiO_2$ and $Ta_2O_5$ with thicknesses of 79.26 nm and 54.86 nm, respectively. The first order peak P2 of the reflectance function FC2 is positioned at the wavelength of 450 nm at which the sum of optical thicknesses of the two layers is exactly 0.5 wavelengths. Consequently, in this example, the first optical filter defined by the function FC1 reflects red light and the second optical filter defined by the function FC2 reflects blue light. The light which is not reflected is transmitted through or passes the optical filter.

It has to be noted that the ratios between on the one hand 111.63 and 79.26 and on the other hand 77.27 and 54.86 are identical. Thus in fact, the optical thicknesses of the layers of the filter defined by the reflectance function FC1 are all scaled with the same factor to obtain the filter defined by the reflectance function FC2. In this example, the scaling factor is sin (23.5 deg)/sin (16.5 deg). These angles are the top angels of the pyramidal shaped structures, and the sine of the angle indicates the fraction of the layer thickness which is evaporated.

FIG. 12 shows that the position of the reflection peak P1, P2 depends on the layer thickness of the layers of the stack. The different layer thicknesses are obtained by suitably selecting the angle of the side walls of the pyramidal shaped elements with respect to their base plane. The suitable angle can be selecting by changing the height and/or the dimensions of the base plane of the pyramidal shaped elements. If now the optical filters are deposited on the surfaces of the pyramids with a same beam flux for the complete structure, the differences in angle of the surfaces of the different pyramidal shaped structures leads to differences in layer thickness and hence to different in color of the reflected light of the stack of layers.

In the embodiment wherein the height of the pyramidal shaped elements is selected differently to obtain the different optical filters, the stack and its layers deposited on the lower pyramidal elements is thicker than the stack and its layers deposited on the higher pyramidal elements. Thus, the optical filter on the lower pyramidal elements has the reflectance function indicated by FC1, and the optical filter on the higher pyramidal elements has the reflectance function indicated by FC2.

However, this scaling approach only shifts the reflection peak P1, P2, while the shape of the different reflectance functions FC1, FC2 can almost not be influenced. With the reflectance functions FC1, FC2 shown in FIG. 12, a significant overlap between the two optical filters occurs due to the fringes besides the peak lobes P1, P2. This may lower the performance of the system because particular light rays may retro-reflect without reaching the display surface, and hence the contrast may degrade. However, if a gap is present between the peak lobes P1, P2 of the two filters, particular light rays may not reach the correct display area and hence the color purity may decrease.

Another drawback is that the position of the peaks P1, P2 depends on the angle of incidence of the light as elucidated in FIG. 14. It becomes clear from FIG. 14 that a significant shift in the peak occurs when the angle of incidence changes. This may lead to an increased overlap between the two optical filters for certain angles and a wavelength gap between the filters for other angles.

The color filters can be optimized for both the problems with the fringes and the problem with the shift of the filter characteristic in wavelength due to the angle of incidence. The amount of the overlap between the two filters can be adapted by adapting the difference in angle of the side walls of the two different pyramids. The individual thicknesses of the layers in the stack can be selected to (partially) suppress, depending on the number of layers, the fringes at certain wavelengths. For example, if the optical layer thicknesses of the $SiO_2$ and $Ta_2O_5$ layers is selected to be 0.166 and 0.333 instead of 0.25 and 0.25, the fringes at the low wavelength side of the reflection peak is suppressed. This is shown in FIG. 13.

However, it is possible to optimize the crosstalk between the optical filters even further by using a computer program which calculates a figure of merit for the filters for many layer thicknesses. The computer program optimizes the figure of merit and as a result presents the optimal layer thicknesses in the stack. An example of optimized filters is shown in FIG. 14. The figure of merit used for the filters of FIG. 14 is the difference between two values. The first value is the overlap between the filter and its scaled version, the second value is the squared reflectance of the filter itself, thus the overlap of the filter with itself. The figure of merit is determined for the wavelength range from 400 nm to 700 nm using angles of incidence of 0 to 80 degrees. The relative strength of the two values is adjustable. An example of the layer thicknesses found with this optimization method are given in the now following table 1 in which the layer thicknesses for the filter shown in FIG. 14 are listed at 700 nm, wherein the refractive indexes are: nTa2O5=2.096 and nSiO2=1.4545, and wherein the scaling factor is sin (23.5 deg)/sin(16.5 deg).

| Layer | Material | Thickness (nm) | Optical Thickness (number of 700 nm wavelengths) |
| --- | --- | --- | --- |
| 0 | Air | | |
| 1 | SiO2 | 119.7803 | 0.249 |
| 2 | Ta2O5 | 22.9290 | 0.069 |
| 3 | SiO2 | 65.2581 | 0.136 |
| 4 | Ta2O5 | 119.7893 | 0.359 |
| 5 | SiO2 | 87.0892 | 0.181 |
| 6 | Ta2O5 | 113.4835 | 0.340 |
| 7 | SiO2 | 64.1528 | 0.133 |
| 8 | Ta2O5 | 111.4554 | 0.334 |
| 9 | SiO2 | 88.0978 | 0.183 |
| 10 | Ta2O5 | 105.4428 | 0.316 |
| 11 | SiO2 | 99.9071 | 0.208 |
| 12 | Ta2O5 | 114.8116 | 0.344 |
| 13 | SiO2 | 34.8626 | 0.072 |
| 14 | Ta2O5 | 114.3586 | 0.342 |
| 15 | SiO2 | 155.8301 | 0.324 |
| 16 | Glass | | |

As becomes clear from table 1, the periodicity is still substantially 0.5 wavelengths. See for example the groups of layers 4 and 5, 6 and 7, 8 and 9, which have a total optical thickness of 0.54, 0.473, 0.517, respectively. The small spread on the sum of the optical thicknesses provides a better suppression of the fringes. The Ta2O5 layers are relatively thicker than the SiO2 layers. FIG. 14 shows that the fringes are greatly reduced. However, the resulting filter is not ideal and is a tradeoff between color purity and contrast.

FIG. 13 shows on example of the reflectance of optical filters with stacks of layers in which the different layers in the same stack have somewhat different thicknesses. The reflectance RF is indicated as a percentage along the vertical axis, the wavelength of the light is indicated along the horizontal axis by λ in nm. As a reference, the reflectance function FC1 already shown in FIG. 12 is repeated in FIG. 13. The reflectance function FC3 shows that it is possible to decrease the amplitude of the fringes by selecting different thicknesses of the different layers in the stack. In the example shown in FIG. 13, the reflectance function FC3 is obtained with a stack of the 15 layers of SiO2 and Ta2O5. The layers of SiO2 have a thickness of 74.42 nm and the layers of Ta2O5 have a thickness of 103.03 nm.

FIG. 14 shows the reflectance of optical filters with scaled layer thicknesses for different angles of incidence of the impinging light. The reflectance RF is indicated as a percentage along the vertical axis, the wavelength of the light is indicated along the horizontal axis by λ in nm. The reflectance as a function of the wavelength for two optical filters is shown. The three curves per filter show the reflectance for three different angles of incidence. The first filter is defined by the curves T11, T12, T13 for the angles of incidence of 70 degree, 45 degree and 0 degree, respectively. The second filter is defined by the curves T21, T22, T23 for the angles of incidence of 70 degree, 45 degree and 0 degree, respectively. The layer thicknesses of the two filters have a scaling factor of sin (23.5 deg)/sin (16.5 deg). The first filter has thinner layers than the second filter. The thickness of the layers is determined according to table 1 to suppress the crosstalk caused by the fringes. The angles of the side walls of the pyramidal shaped elements should be selected to minimize overlap of the reflectance functions while still an optimal color purity is obtained.

FIG. 15 shows the reflectance of two optical filters with scaled layer thickness of which the second and the first order reflectance peak, respectively, is used. The reflectance RF is indicated as a percentage along the vertical axis, the wavelength of the light is indicated along the horizontal axis by λ in nm.

Preferably, the stack of layers comprises multiple groups of two layers. Each group of two layers has the same type of layers in the same order. The refractive index of the two layers in the same group is different. The thickness of corresponding layers in the groups may be different, but the thickness of the groups is preferably substantially identical. The first order peak of the reflectivity of such a stack of groups of layers occurs for light of which half a wavelength is equal to the thickness of the groups of layers. The second order peak of the reflectivity of the stack occurs for light of which one wavelength is equal to the thickness of the groups of layers thus for light with a shorter wavelength. Even higher order peaks of reflectivity occur at even shorter wavelengths. Alternatively, more than two layers may be present in a group of layers.

The embodiments of the color filters in accordance with the invention shown in FIGS. 12 and 14 use the first order peaks of the reflectance of the two stacks. Consequently, the thickest stack due to the thicker layers will have its peak of reflectance at a longer wavelength.

In the embodiment of the color filter shown in FIG. 15, the optical separating filter comprises a first and a second group of pyramidal shaped elements PE1, PE2 on which a first and second optical filter CF1, CF2 is present, respectively. The first optical filter CF1 has the reflectance indicated by the function CF21, the second optical filter CF2 has the reflectance indicated by the function CF22. The angle of the side walls of the first pyramidal shaped elements PE1 with respect to their bases is smaller than the angle of the side walls of the second pyramidal shaped elements PE2 with respect to their bases. For example, the pyramidal shaped elements PE1 of the first group have a lower height that the pyramidal shaped elements PE2 of the second group. The different thicknesses of the stacks are selected to obtain a second order reflection peak P21b of the first optical filter CF1 which occurs at a shorter wavelength λ1 than a first order reflection peak P22a of the second optical filter CF2. For example, the angles are selected to obtain the second order reflection peak P21b of the reflectance CF21 of the first optical filter CF1 for blue light and the first order reflection peak P22a of the reflectance CF22 of the second optical filter CF2 for red light.

Preferably, the stack is selected such that both the first order reflection peak P21a of the first optical filter CF1 and the second order reflection peak P22b of the second optical filter CF2 lies outside a visible range of light VR. For example, if the second order reflection peak P21b of the first optical filter CF1 occurs for blue light, the first order reflection peak P21a of the first optical filter CF1 may occur in the infrared red range.

It has to be noted that the use of the second order peak of the reflection is based on the property that an optical filter with a certain periodicity not only reflects the light at which the sum of the two optical layer thicknesses matches half a wavelength. Such a filter also reflects higher orders, for example, if one complete wavelength fits in the sum of the two optical thicknesses of the layers. Although, taking each of the two layers exactly 0.5 wavelength thick results in a canceling of the second order peak. Taking different thicknesses for the two layers, for example 0.33 and 0.66, results in the generation of the second order peak. This filter is evaporated on all the pyramidal shaped elements PE1, PE2. Evaporating such a filter onto the steeper surfaces of the higher pyramidal shaped elements PE2 such that the first order peak P22a occurs in the visible range VR, results in the second order peak P22b at relatively short wavelengths outside the visible range. Due to the scaling, on the less steep surfaces of the lower pyramidal shaped elements PE1, the first order peak P21a occurs at a longer wavelength than the first order peak P22a and the second order peak P21b at a longer wavelength than the second order peak P22b. By selecting a suitable difference between the angles of the first and the second pyramidal shaped elements PE1, PE2, the second order peak P21b occurs at a shorter wavelength than the first order peak P22a, and the first order peak P21a occurs at relatively long wavelengths outside the visible range VR.

This approach provides different optimization possibilities for the filters. Instead of optimizing for each filter one reflection peak with zero reflection on each side, now two reflection peaks with zero reflection in-between has to be optimized. Another advantage of this approach is that the second order reflection peak usually has a sharper boundary than the first order reflection peak, resulting in a smaller overlap between the two filters. The layer thicknesses found with an optimization method similar to that discussed with respect to table 1 are given in the now following table 2 in which the layer thicknesses are listed at 500 nm, wherein the refractive indexes are: nTa2O5=2.146 and nSiO2=1.4615, and wherein the scaling factor is sin (23.5 deg)/sin(16.5 deg).

| Layer | Material | Thickness (nm) | Optical Thickness (number of 500 nm wavelengths) |
|---|---|---|---|
| 0 | Air | | |
| 1 | SiO2 | 111.3099 | 0.325 |
| 2 | Ta2O5 | 104.335 | 0.448 |
| 3 | SiO2 | 205.8197 | 0.602 |
| 4 | Ta2O5 | 150.6325 | 0.647 |
| 5 | SiO2 | 58.67113 | 0.171 |
| 6 | Ta2O5 | 180.5103 | 0.775 |
| 7 | SiO2 | 82.43481 | 0.241 |
| 8 | Ta2O5 | 178.724 | 0.767 |
| 9 | SiO2 | 90.22715 | 0.264 |
| 10 | Ta2O5 | 178.8828 | 0.768 |
| 11 | SiO2 | 93.19559 | 0.272 |
| 12 | Ta2O5 | 180.6934 | 0.776 |
| 13 | SiO2 | 81.46763 | 0.238 |
| 14 | Ta2O5 | 172.6236 | 0.741 |
| 15 | SiO2 | 6.883115 | 0.020 |
| 16 | Glass | | |

To conclude, it has been discussed that more than one type of reflective color filter can be evaporated in one series of the same steps by making use of pyramidal shaped elements with different heights. The different filters are related to each other by a scaling of the thickness of all the layers. Two possibilities exist for using a system with two colors. Firstly: on the lower of the two pyramids a filter is evaporated which has the first order reflection peak in the red wavelength range and the heights of the pyramidal shaped elements are selected such that, the in the same steps evaporated filter on the higher pyramidal shaped elements which has a first order reflection peak in the blue range. Secondly, on the lower pyramidal shaped elements a filter is evaporated which has the second order reflection peak in the blue wavelength range and the heights of the pyramidal shaped elements are selected such that, the in the same steps evaporated filter on the higher pyramids has a first order reflection peak in the red.

In the first solution, the filter preferably comprises one reflection peak with at both sides a zero reflection. In the second solution the filter preferably comprises two reflection peaks with a zero reflection in-between.

Preferably, the optimization of the filter take into account the dispersion (thus, a dependence of the refractive index on the wavelength), and/or the change in the wavelength at which the peak reflection occurs due to a change of the angle of incidence. Further, the layer thicknesses can be adjusted such that the fringes are (partially) suppressed.

It might be advantageous to make the color filters non-uniform because of the non-uniform angle of incidence of the light across the pyramids. This can be advantageous because the angle of incidence of the light tends to be more perpendicular to the color filter at the bottom of the pyramid and more oblique at the top of the pyramid. This non-uniform coating can be used for both the two filter types described. A non-uniform coating can be obtained by, for example, sputtering a color filter into a pyramidal shaped hole. The deposition flux and hence the layer thickness decreases as one gets further into the hole.

It should be noted that the above-mentioned embodiments illustrate rather than limit the invention, and that those skilled in the art will be able to design many alternative embodiments without departing from the scope of the appended claims.

For example, if a viewer is defined, the color separating filter is in-between the viewer and the reflective pixels of the display. If however the pixels are modulating their transmission, this viewer is positioned near the display, and the display is in-between the viewer and the color separating filter.

Instead of just using the first order peak we can also only use the second (or third etc) order peaks. However, this generally leads to thicker layers. Also we can stack a first order filter on top of a second order filter. This leads to a periodicity of 0.5 and 1.0 in the same filter. Alternatively, instead of using the first order peak for the higher of the two pyramidal shaped structures and the second order peak for the lower of the two pyramidal shaped structures, the second and third order (etc.) peaks may be used.

Instead of just using two types of layers it is possible to use three or more types of layers.

Further, it is possible to use pyramidal shaped structures with more than two different heights. This results in, for example, three pyramid heights: 1) all the three pyramidal shaped structures have a first order filter, 2) the lowest pyramidal shaped structures have a second order filter while the other two have a first order filter, or 3) the lowest two pyramidal shaped structures have a second order filter, the highest pyramidal shaped structures have a first order filter.

The above color filters can also be realized to separate more than two different colors.

The optical separating filter in accordance with the invention can cooperate with several displays, such as for example, e-ink displays, LCD's, electro-wetting displays, electrochromic displays. Preferably the display should be a diffuse reflecting display because such displays provide the best readable image. It may be advantageous to add absorbing color filters to prevent color errors due to non-ideal filter characteristics or mechanical deviations in the structure.

Anywhere where the separation into colors is discussed, it is meant that the spectrum is separated into sub-spectrums which may partly overlap. If the visible spectrum is separated into sub-spectrums, these sub-spectrums are visible as different colors. Instead of color filters', also polarization filters may be used which has the advantage that light of both polarizations is directed to different pixels and thus all the impinging light is used instead of only half of it.

The optical separation filter in accordance with the invention may also be used in back-lit displays such as LCD's.

Although all embodiments have been described for visible light, the invention can also be used to split different parts of the spectrum outside the visible spectrum. Thus, the invention can be used for infra-red light, ultra-violet light, x-ray, etc.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An optical separating filter for separating impinging light into a first and a second part having different properties, the separating filter comprises reflective filters (FR) being arranged in funnel shaped structures (F1), each one of said funnel shaped structures (F1) having an inlet area (IA1) for receiving the impinging light (IL), an outlet area (OA1) being smaller than the inlet area (IA1) and walls having a decreasing distance towards the outlet area (OA1) for converging reflected impinging light (RL) towards the outlet area (OA1), said structures (F1) comprising a first group of funnel shaped structures (F1) being constructed for reflecting light having a first property (C1) towards their respective first outlet areas (OA1) and for transmitting light having a second property (C2) towards respective second outlet areas (OA2).

2. An optical separating filter as claimed in claim 1, wherein said first group (F1) is arranged for forming a plurality of first optical filters (CF1) covering the second outlet areas (OA2).

3. An optical separating filter as claimed in claim 1, wherein the separating filter comprises further reflective filters (FG) being arranged in second group of funnel shaped structures (F2), each one of said second structures (F2) having a second inlet area (IA2) for receiving the impinging light (IL) and a second outlet area (OA2) being smaller than the second inlet area (IA2) to converge reflected impinging light (RL) towards the second outlet area (OA2), the first group of funnel shaped structures (F1) being constructed for reflecting light having a first property (C1) towards their respective first outlet areas (OA1) and for transmitting light having a second property (C2) towards respective second outlet areas (OA2) of the second group of funnel shaped structures (F2), wherein the second group of funnel shaped structures (F2) is constructed for reflecting light having the second property (C2) towards their respective second outlet areas (OA2) and for transmitting light having the first property (C1) to the respective first outlet areas (OA1).

4. An optical separating filter as claimed in claim 3, wherein said first group (F1) is arranged for forming a plurality of first optical filters (CF1) covering the second outlet areas (OA2), and wherein said second group (F2) is arranged for forming a plurality of second optical filters (CF2) covering said first outlet areas (OA1).

5. An optical separating filter as claimed in claim 4, wherein the first optical filters (CF1) comprise polygonal structures with a polygonal shaped base plane (B1), and wherein, in a direction towards the impinging light (IL), a cross section parallel to the base plane (B1) gradually narrows in one or two dimensions.

6. An optical separating filter as claimed in claim 5, wherein the polygonal structures comprise pyramidal shaped elements (PE1) having base planes (B1) being directed towards the second outlet areas (OA2).

7. An optical separating filter as claimed in claim 4, wherein the first optical filters (CF1) comprise pyramidal shaped elements (PE1) having base planes (B1) being directed towards the second outlet areas (OA2) and all having a first height (H1), and wherein the second optical filters (CF2) comprise pyramidal shaped elements (PE2) having base planes (B2) being directed towards the first outlet areas (OA1) and all having a second height (H2) being different than the first height (H1) to obtain first and second pyramidal shaped elements (PE1, PE2) having side walls with a first angle and a second angle, respectively, with respect to their base, the first and the second angle being different.

8. An optical separating filter as claimed in claim 4, wherein the first optical filters (CF1) comprise first pyramidal shaped elements (PE1) having base planes (B1) being directed towards the second outlet areas (OA2) and all having a first dimension (D1), and wherein the second optical filters (CF2) comprise second pyramidal shaped elements (PE2) having base planes (B2) being directed towards the first outlet areas (OA1) and all having a second dimension (D2) being different than the first dimension (D1) to obtain first and second pyramidal shaped elements (PE1, PE2) having side walls with a first angle and a second angle, respectively, with respect to their base, the first and the second angle being different.

9. An optical separating filter as claimed in claim 3, wherein
the first group of funnel shaped structures (F1) and the second group of funnel shaped structures (F2) comprise a first stack of layers (SL1) and a second stack of layers (SL2) arranged on side walls of the first and the second funnel shaped structures (F1, F2), respectively, wherein successive layers (LAi) of both the first and the second stack (SL1, SL2) have a different refractive index (ni).

10. An optical separating filter as claimed in claim 7, wherein
the first and second optical filters (CF1, CF2) comprise a first stack of layers (SL1) and a second stack of layers (SL2) arranged on the side walls of the first and the second pyramidal shaped elements (PE1, PE2), respectively, wherein successive layers (LAi) of both the first and the second stack (SL1, SL2) have a different refractive index (ni), and wherein both the first and the second stack (SL1, SL2) comprises a same number of the layers which are ordered in the same order, and a first thickness (D1) of the first stack of layers (SL1) differs from a second thickness (D2) of the second stack of layers (SL2).

11. An optical separating filter as claimed in claim 10, wherein said first angle and said second angle are selected to obtain the first thickness and the second thickness, respectively, to obtain the first optical filter (CF1) with a first order reflection peak at a wavelength different than a first order reflection peak of the second optical filter (CF2).

12. An optical separating filter as claimed in claim 11, wherein said first angle is smaller than said second angle to obtain a first order reflection peak of the first optical filter (CF1) which occurs at a longer wavelength than a first order reflection peak of the second optical filter (CF2).

13. An optical separating filter as claimed in claim 11, wherein said first angle is smaller than said second angle to obtain a second order reflection peak of the first optical filter (CF1) at a shorter wavelength than a first order reflection peak of the second optical filter (CF2).

14. An optical separating filter as claimed in claim 13, wherein the first order reflection peak of the first optical filter (CF1) lies outside a visible range of light.

15. An optical separating filter as claimed in claim 5, wherein a shape of the base planes (B1) is triangular, rectangular, square, pentagonal or hexagonal.

16. An optical separating filter as claimed in claim 6, wherein a particular one of the first outlet areas (OA1) is surrounded by second outlet areas (OA2) to obtain a pattern of alternating first outlet areas (OA1) and second outlet areas (OA2).

17. An optical separating filter as claimed in claim 3 further comprising
third outlet areas (OA3), the first group of funnel shaped structures (F1) being further constructed for reflecting light having the first property (C1) towards the third outlet areas (OA3) and for transmitting light having the second property (C2), wherein the first property (C1) is a first color and the second property (C2) is a second color being different than the first color,
first absorbing color filters (CF3) for filtering light directed towards the third outlet areas (OA3), and
second absorbing color filters (CF4) for filtering light directed towards the first outlet areas (OA1), wherein colors of light impinging on the first, second and third outlet areas (OA1, OA2, OA3) are different.

18. An optical separating filter as claimed in claim 17 further comprising third color filters (CF5) for filtering light directed towards the second outlet areas (OA2).

19. An optical separating filter as claimed in claim 17, wherein the first optical filters (CF1) comprise pyramidal shaped elements (PE1) being associated with corresponding ones of the first and the third outlet areas (OA1, OA3), base planes (B1, B2) of these pyramidal shaped elements (PE1) being directed towards the first and the third outlet areas (OA1, OA3), respectively.

20. An optical separating filter as claimed in claim 4, wherein at least one of the funnel shaped structures of the first group of funnel shaped structures (F1) comprises
a first section (RTS) reflecting light having the first property (C1) and transmitting light having the second property (C2), and
a second section (RS) being reflective for light having both the first and second property (C1, C2).

21. An optical separating filter as claimed in claim 20, wherein the second section (RS) being reflective for light having both the first and second property (C1, C2) is arranged substantially perpendicular to a plane wherein the first and second outlets (OA1, OA2) are arranged.

22. An optical separating filter as claimed in claim 20, further comprising
third outlet areas (OA3) being arranged in-between at least two substantially vertically arranged second sections being reflective for light having both the first and second property (C1, C2), wherein the first property (C1) is a first color and the second property (C2) is a second color being different than the first color, and a first absorbing color filter (CF8) for filtering light directed towards the third outlet areas (OA3), wherein colors of light impinging on the first, second and third outlet areas (OA1, OA2, OA3) are different.

23. An optical separating filter as claimed in claim 3, wherein the first group of funnel shaped structures (F1) and the second group of funnel shaped structures (F2) are arranged in a first plane (PL1) parallel to an output plane (PP) wherein the outlet areas (OA1, OA2) are arranged, the optical separating filter further comprises a third group of funnel shaped structures (P3) and a fourth group of funnel shaped structures (P4) being arranged in a second plane (PL2) parallel with the output plane (PP) and in-between the first plane (PL1) and the output plane (PP), said third group (P3) and said fourth group (P4) being arranged for cooperating with said first group (F1) and said second group to split the impinging light (IL) in light having at least three different properties.

24. An optical separating filter as claimed in claim 23, wherein
the first plane (PL1) comprises first pyramidal shaped structures with a triangular base, three side planes with three different reflective color filters reflecting red (R), green (G) and blue (B) light, respectively, and transmitting green (G) and blue (B) light, red (R) and blue (B) light, and red (R) and green (G) light, respectively, and tops (T1) being directed towards the second plane (PL2), and
the second plane (PL2) comprises second pyramidal shaped structures with a pentagonal base, five side planes with further reflective color filters, and further tops (T2) being directed towards the first plane (PL1) and being positioned in-between the first mentioned tops (T1), wherein the further reflective color filters
(i) are identical for planes of a same one of the second pyramidal structures, but different for adjacent pyramidal structures, the further reflective color filters being transparent for red (R), green (G), blue (B) light, respectively, and reflective for green (G) and blue (B) light, green (G) and red (R) light, blue (B) and red (R) light, respectively, or
(ii) are different for and alternate for adjacent side planes of a same one of the second pyramidal structures to obtain three different second pyramidal structures having two different ones of further reflective color filters being selected out of reflective color filters reflecting red (R), green (G) and blue (B) light, respectively, and transmitting green (G) and blue (B) light, red (R) and blue (B) light, and red (R) and green (G) light, respectively.

25. An optical separating filter as claimed in claim 1, wherein the first property (C1) is a first color and the second property (C2) is a second color being different than the first color.

26. An optical separating filter as claimed in claim 1, wherein the first property (C1) is a first polarization state and the second property (C2) is a second polarization state being different than the first polarization state.

27. A display panel comprising the optical separating filter as claimed in claim 1, the first outlet areas (OA1) being associated with respective first pixel elements (PR) of the display, and the second outlet areas (OA2) being associated with respective second pixel elements (PR) of the display.

28. A display panel comprising the optical separating filter as claimed in claim 17, the first outlet areas (OA1) being associated with respective first pixel elements (PR) of the display, the second outlet areas (OA2) being associated with respective second pixel elements (GR) of the display, and the third outlet areas (OA3) being associated with respective third pixel elements (BR) of the display.

29. A display panel as claimed in claim 27, wherein the display comprises a matrix display.

30. A display apparatus comprising the display panel of claim 27 and a circuitry to provide image information to the panel.

31. A solar panel comprising the optical separating filter as claimed in claim 1, the first outlet areas (OA1) being associated with respective first solar cells (SCa) of the solar panel, and the second outlet areas (OA2) being associated with respective second solar cells (SCb) of the solar panel.

* * * * *